United States Patent
Miyata

(10) Patent No.: US 8,540,277 B2
(45) Date of Patent: Sep. 24, 2013

(54) PASSENGER-SIDE AIRBAG FOLDED BODY AND PASSENGER-SIDE AIRBAG APPARATUS

(75) Inventor: Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/297,704

(22) Filed: Nov. 16, 2011

(65) Prior Publication Data

US 2012/0126515 A1    May 24, 2012

(30) Foreign Application Priority Data

Nov. 19, 2010    (JP) ................................. 2010-259312

(51) Int. Cl.
- *B60R 21/237*    (2006.01)
- *B60R 21/239*    (2006.01)
- *B60R 21/205*    (2011.01)

(52) U.S. Cl.
USPC ........................................ 280/739; 280/732

(58) Field of Classification Search
USPC ........... 280/739, 732, 731, 728.1, 729, 728.2, 280/730.1, 743.1; 180/274; 493/458
See application file for complete search history.

(56) References Cited

U.S. PATENT DOCUMENTS

| | | | | |
|---|---|---|---|---|
| 5,564,730 | A | * | 10/1996 | Chizenko et al. .......... 280/728.1 |
| 7,445,239 | B2 | * | 11/2008 | Okada et al. ............... 280/743.1 |
| 7,631,894 | B2 | | 12/2009 | Hasebe et al. |
| 7,703,802 | B2 | * | 4/2010 | Suzuki ........................ 280/743.1 |
| 7,770,922 | B2 | * | 8/2010 | Schneider et al. ............ 280/739 |
| 7,793,975 | B2 | | 9/2010 | Fukawatase et al. |
| 7,926,844 | B2 | * | 4/2011 | Williams et al. ........... 280/743.1 |
| 2007/0024032 | A1 | * | 2/2007 | Hasebe .......................... 280/729 |
| 2009/0108574 | A1 | * | 4/2009 | Lachat et al. .............. 280/743.1 |
| 2011/0042922 | A1 | * | 2/2011 | Miyata ....................... 280/730.1 |
| 2011/0291391 | A1 | * | 12/2011 | Okamoto et al. .......... 280/728.2 |

FOREIGN PATENT DOCUMENTS

| | | |
|---|---|---|
| JP | H6-227353 A | 8/1994 |
| JP | 2004-268903 A | 9/2004 |
| JP | 2007-030615 A | 2/2007 |
| JP | 4245590 B2 | 1/2009 |

\* cited by examiner

*Primary Examiner* — Keith Frisby
(74) *Attorney, Agent, or Firm* — Fitch, Even, Tabin & Flannery, LLP

(57) ABSTRACT

There is provided a passenger-side airbag folded body in which an inflator opening is provided at a base end of an airbag and a vent hole is provided at each of right and left side surfaces of the airbag. Right and left end parts of the airbag are folded along vertical fold lines, thereby providing a vertically long primary folded body. The primary folded body is folded along lateral fold lines, thereby providing the passenger-side airbag folded body serving as a final folded body, and the vent holes are exposed at right and left end faces of the final folded body.

10 Claims, 19 Drawing Sheets

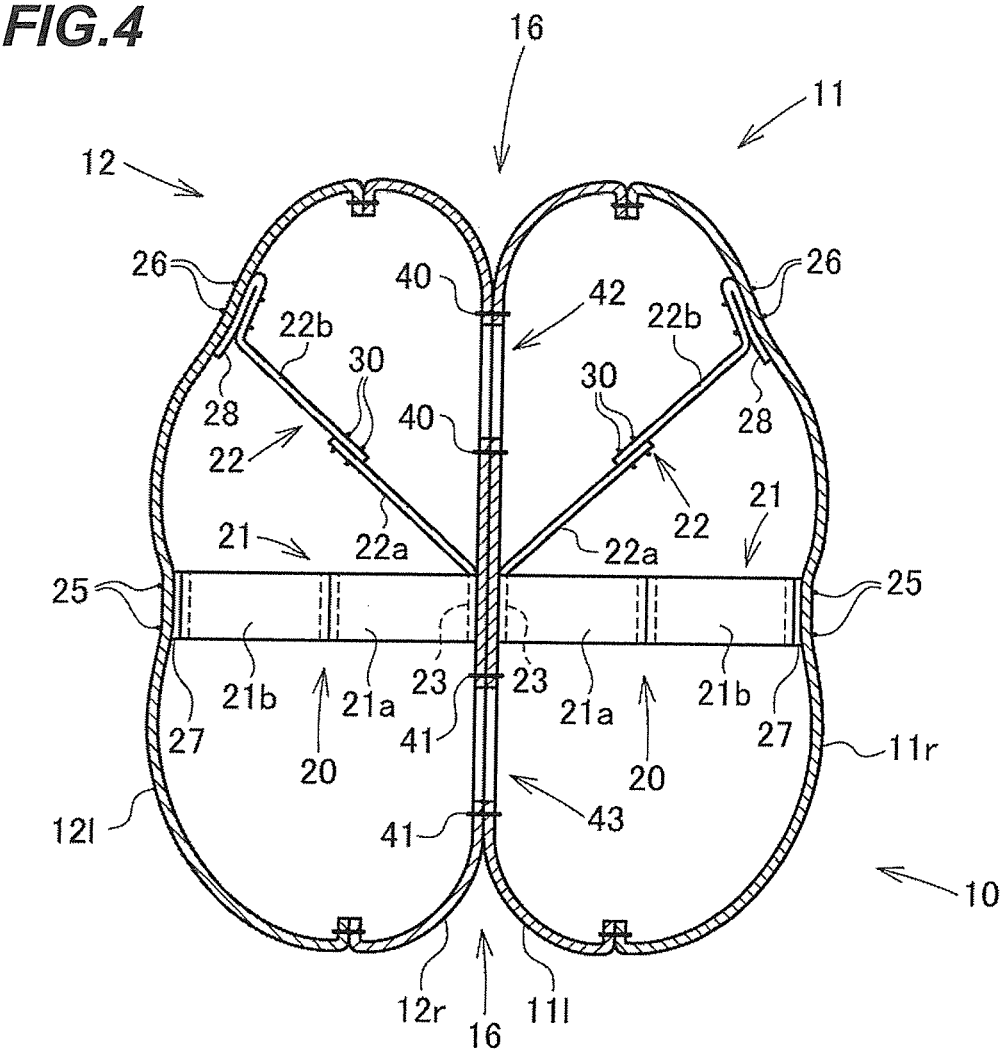

PASSENGER-SIDE AIRBAG FOLDED BODY AND PASSENGER-SIDE AIRBAG APPARATUS

CROSS-REFERENCE TO RELATED APPLICATION

This application claims priority under 35 U.S.C. §119 to Japanese Patent Application No. 2010-259312, filed on Nov. 19, 2010, the entire content of which is herein incorporated by reference in its entirety.

BACKGROUND

1. Technical Field

Embodiments described herein relate to a passenger-side airbag folded body for restraining an occupant on a passenger seat at the time of vehicle collision or the like, and in particular relates to a passenger-side airbag folded body in which an inflator opening is provided at a base end thereof in an inflation direction and a vent hole is provided at each of right and left side surfaces thereof. Furthermore, the embodiments relate to an airbag apparatus including the passenger-side airbag folded body.

2. Related Art

As a method for folding a passenger-side airbag for restraining an occupant on a passenger seat at the time of vehicle collision or the like, the following folding method is illustrated in FIGS. 3 and 4 of Japanese Unexamined Patent Application Publication No. 6-227353. In this method, after an airbag has been flatly spread out, right and left sides of the airbag are folded so that the airbag is formed into a vertically elongated band-like body, a lower portion of the band-like body is folded in a bellows-like manner or in a roll-like manner, and then an upper portion of the band-like body is folded in a bellows-like manner.

As a passenger-side airbag, an airbag is known which includes a right half airbag and a left half airbag, which are to be inflated toward the right front and left front of an occupant, respectively. These airbags are inflated by a common inflator. A method for folding such an airbag is disclosed in Japanese Unexamined Patent Application Publication No. 2007-45190.

According to this patent document No. 2007-45190, when the airbag is folded, each of the right half airbag and the left half airbag is first transversely placed, and is then spread flatly in vertical and longitudinal directions. Subsequently, the left half airbag is folded in a roll-like manner or in a bellows-like manner from upper and lower ends thereof toward a vertical center, and is thus formed into a strip-like folded body elongated in the longitudinal direction. Further, the right half airbag is also similarly folded in a roll-like manner or in a bellows-like manner from upper and lower ends thereof toward a vertical center, and is thus formed into a strip-like folded body elongated in the longitudinal direction. Then, the resulting right half airbag and left half airbag folded bodies are each folded so that its longitudinal length is reduced, thus providing a final block-like folded body.

At the time of vehicle collision, gas flows from the inflator into the airbag through an inflator opening provided at an airbag base end, and thus the gas flows into each of the right half airbag and the left half airbag from the airbag base end. As a result, the right half airbag and the left half airbag are inflated toward the right front and left front of an occupant, respectively, to receive the arms of the occupant. A vent hole is provided at each of a right lateral surface of the right half airbag and a left lateral surface of the left half airbag; thus, when the occupant comes into contact with the inflated right half airbag and left half airbag, the gas flows out of the airbag through each vent hole, thereby absorbing an impact applied to the occupant.

In the airbag folding method disclosed in Japanese Unexamined Patent Application Publication No. 6-227353, when the airbag is formed into an elongated band-like body as illustrated in FIG. 3, vent holes are folded into the airbag. Since the band-like body is further bellows-folded or roll-folded in this state, the vent holes are buried inside an airbag folded body. Therefore, in the method disclosed in this patent document, the vent holes will not be opened to the atmosphere until an inflator is activated and the airbag is inflated to a considerably large size, and thus gas will hardly flow out of the vent holes during this period of time.

Furthermore, in the folding method disclosed in Japanese Unexamined Patent Application Publication No. 2007-45190, when the right half airbag and the left half airbag are each folded in a roll-like manner or in a bellows-like manner from the upper and lower ends thereof toward the vertical center, panel portions of the right half airbag and the left half airbag are folded over the vent holes. Therefore, in the method disclosed in this patent document, even when the inflation of the airbag is started, gas is not allowed to sufficiently flow out of each vent hole until the vertical folding of the right half airbag and the left half airbag is unfolded.

In light of the above facts, the conventional passenger-side airbag has the following problem. When the airbag is inflated in a state where an object such as an occupant is present over an instrument panel or in the immediate vicinity thereof, the object comes into contact with the airbag before the airbag is sufficiently unfolded. Hence, even when the object is brought into contact with the airbag, gas might not be allowed to sufficiently flow out of each vent hole, and thus a force applied to the object from the airbag might be increased.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages.

Accordingly, it is an illustrative aspect of the present invention to provide an airbag folded body capable of allowing gas to sufficiently flow out of an airbag through a vent hole at an early stage after the start of inflation of the airbag when the airbag is inflated in a state where an object such as an occupant is present over an instrument panel or in the immediate vicinity thereof; and an airbag apparatus including the airbag folded body.

According to a first aspect of the present invention, there is provided a passenger-side airbag folded body in which an inflator opening is provided at a base end of an airbag and a vent hole is provided at each of right and left side surfaces of the airbag. Right and left end parts of the airbag are folded along vertical fold lines, thereby providing a vertically long primary folded body. The primary folded body is folded along lateral fold lines, thereby providing the passenger-side airbag folded body serving as a final folded body, and the vent holes are exposed at right and left end faces of the final folded body.

According to a second aspect of the present invention, a plurality of small holes are provided around the inflator opening. A bag attachment ring, comprising a frame body surrounding the inflator opening and a plurality of bolts provided vertically with respect to the frame body, is attached so as to surround the inflator opening, each bolt is inserted through the associated small hole, and a bag base end part located between the bag attachment ring and the vent holes is folded into the inside of the bag just once.

According to a third aspect of the present invention, a portion of the primary folded body, located below the bag attachment ring, is subjected to roll folding, and a portion of the primary folded body, located above the bag attachment ring, is subjected to bellows folding.

According to a fourth aspect of the present invention, the airbag is formed into a spread body flatly spread out so that its longitudinal thickness is reduced, and then right and left end portions of the spread body are folded along the vertical fold lines, thereby providing the primary folded body. In the spread body, the inflator opening is exposed at a surface of the spread body, located opposite to an occupant, and each vent hole is at least partially located at a position that is below an upper end of an outer peripheral edge of the bag attachment ring surrounding the inflator opening, and that is above a lower end of the outer peripheral edge of the bag attachment ring.

According to a fifth aspect of the present invention, there is provided a passenger-side airbag apparatus comprising: the passenger-side airbag folded body; and an inflator configured to inflate the airbag.

According to a sixth aspect of the present invention, there is provided an airbag for a passenger seat that is folded up in a normal state and is inflated and deployed in an emergent state by deployment gas supplied from an inflator. The airbag comprises: a base fabric constituting an outer shell of the airbag. The base fabric comprises: a base end surface having an inflator opening through which the inflator is to be inserted; a right side surface having a right vent hole; and a left side surface having a left vent hole. The base fabric is folded in the normal state such that the right and left vent holes are exposed from an outside.

In the passenger-side airbag folded body and passenger-side airbag apparatus according to the present invention, the vent holes, provided at the right and left sides of the airbag, are exposed at the right and left end faces of the final folded body of the airbag, respectively. Accordingly, upon inflation of the airbag in a state where an object such as an occupant is present over an instrument panel or in the immediate vicinity thereof and upon contact of the object with the airbag right after the start of the inflation of the airbag, gas quickly flows out of the airbag through each vent hole, thus reducing a force applied to the object from the airbag.

According to the second aspect, the bag base end part located between the bag attachment ring and the vent holes is folded into the inside of the bag just once. Thus, at the time of inflation of the airbag, a portion of the airbag, located between the bag attachment ring and the vent holes, is quickly unfolded, thereby allowing gas to flow out of the airbag through the vent holes.

According to the third aspect, after the airbag has been formed into the vertically long primary folded body, the portion of the primary folded body located below the bag attachment ring, i.e., a lower part of the airbag, is preferably roll-folded, and the portion of the primary folded body located above the bag attachment ring, i.e., an upper part of the airbag, is preferably bellows-folded. When the airbag is folded in this manner, since bellows folding is easily unfolded, the upper part of the airbag will be quickly swollen upward and expanded toward the front of the occupant at the time of inflation of the airbag. Further, the lower part of the airbag is roll-folded and is thus expanded in such a manner that the lower part of the airbag rolls down downward at the time of inflation of the airbag, thereby allowing the lower part of the airbag to be smoothly expanded between the instrument panel and the occupant.

According to the fourth aspect, when the airbag is folded, the airbag is first formed into the spread body flatly spread out so that its longitudinal thickness is reduced. In this case, the inflator opening at the base end of the airbag is located so as to be exposed at the surface of the spread body, which is opposite to the occupant. Furthermore, each vent hole is at least partially located at the position that is below the upper end of the outer peripheral edge of the bag attachment ring surrounding the inflator opening, and that is above the lower end of the outer peripheral edge of the bag attachment ring. When the vertically long primary folded body is provided by folding the right and left end portions of the spread body along the vertical fold lines and the airbag folded body serving as the final folded body is provided by further folding the primary folded body along the lateral fold line, each vent hole is at least partially located right above the bag attachment ring. Therefore, a distance between the inflator opening and each vent hole is short, and thus gas ejected from an inflator reaches each vent hole after a lapse of a short time from the start of inflation of the airbag, so that the gas will quickly flow out of the airbag through each vent hole.

Other aspects and advantages of the present invention will be apparent from the following description, the drawings and the claims.

BRIEF DESCRIPTION OF THE DRAWINGS

FIG. 4 is a cross-sectional view taken along the line IV-IV of FIG. 2;

DETAILED DESCRIPTION

Hereinafter, exemplary embodiments of the present invention will be described with reference to the drawings.

Figure 1:
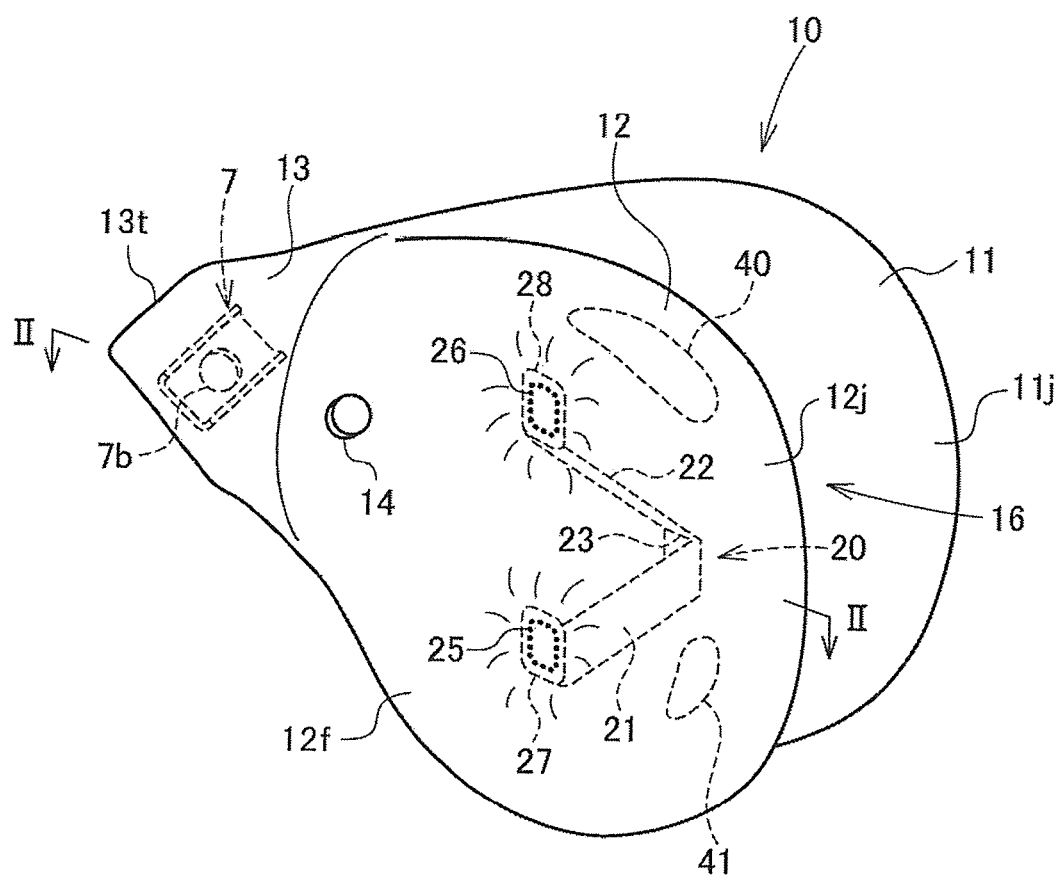
FIG. 1 is a perspective view of a passenger-side airbag to be folded into an airbag folded body according to an embodiment of the present invention.
Figure 2:
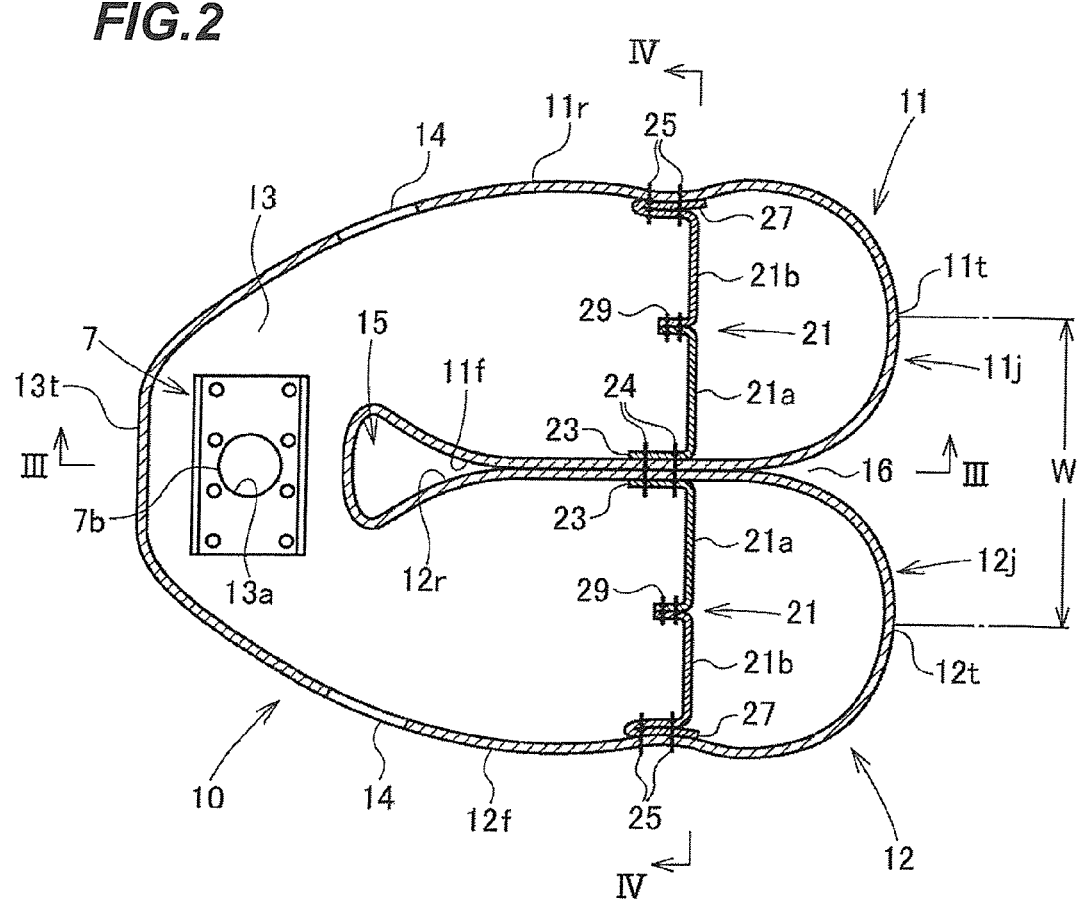
FIG. 2 is a cross-sectional view taken along the line II-II of FIG. 1.
Figure 3:
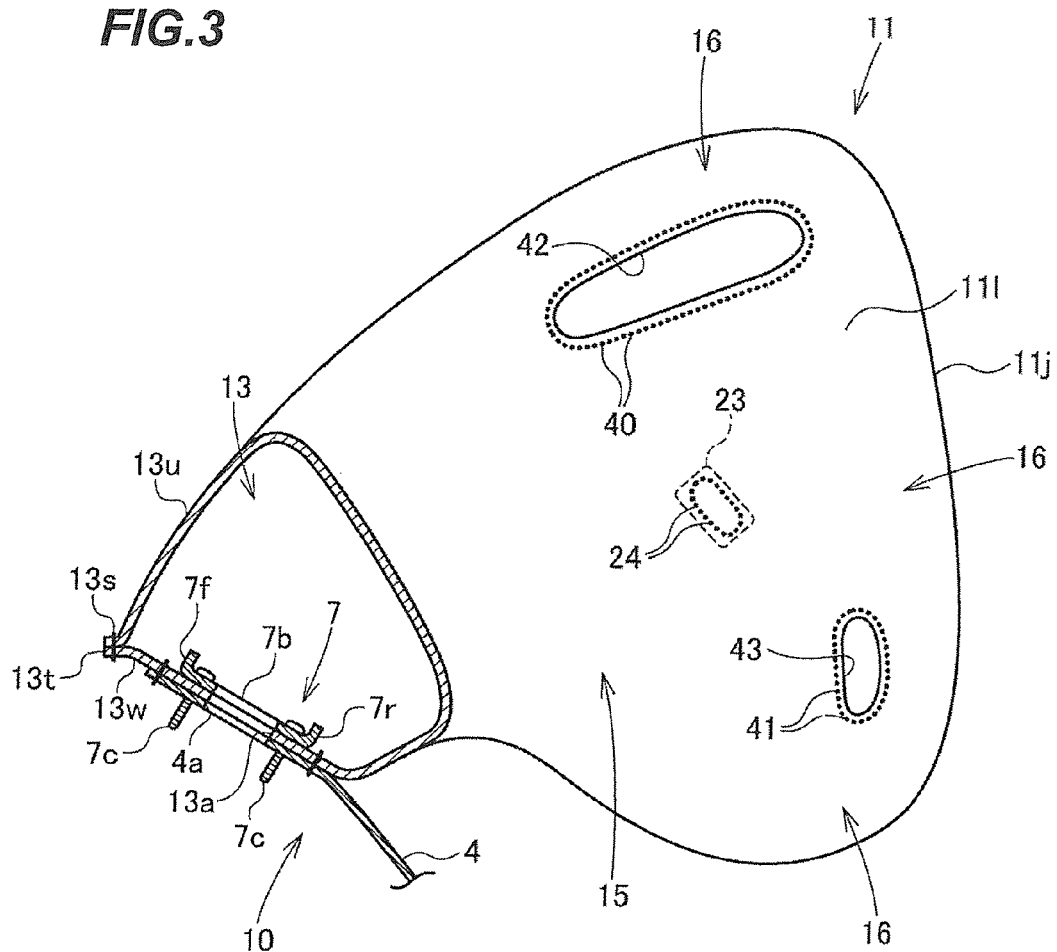
FIG. 3 is a cross-sectional view taken along the line III-III of FIG. 2.
Figure 5A:
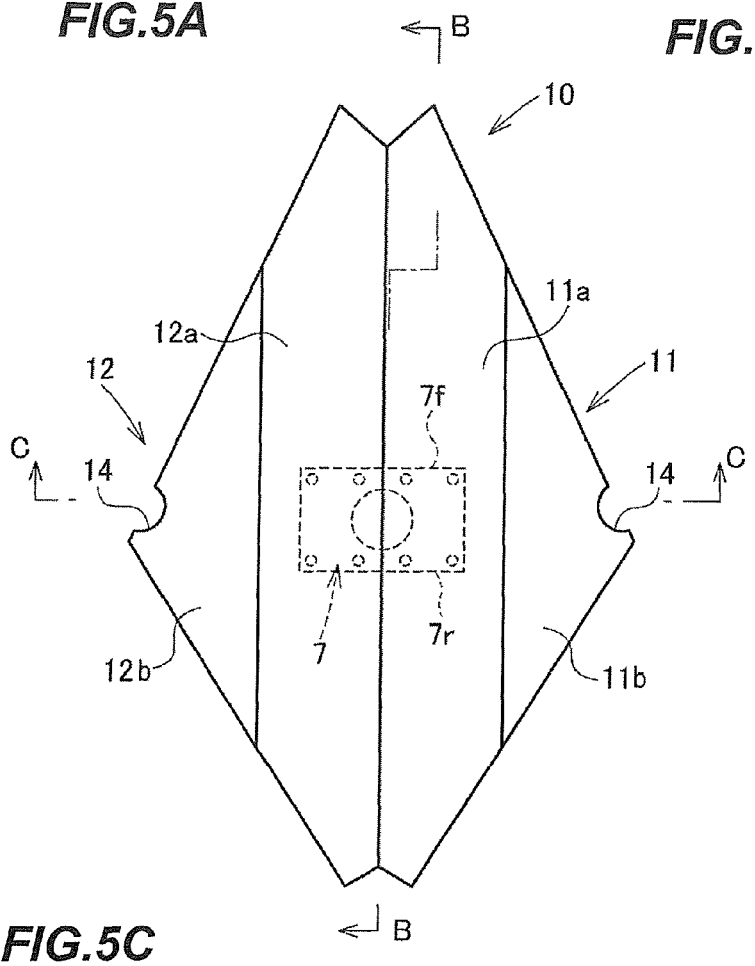
FIGS. 5A to 5C are explanatory diagrams illustrating a procedure of folding of the airbag illustrated in FIG. 1.
Figure 5B:
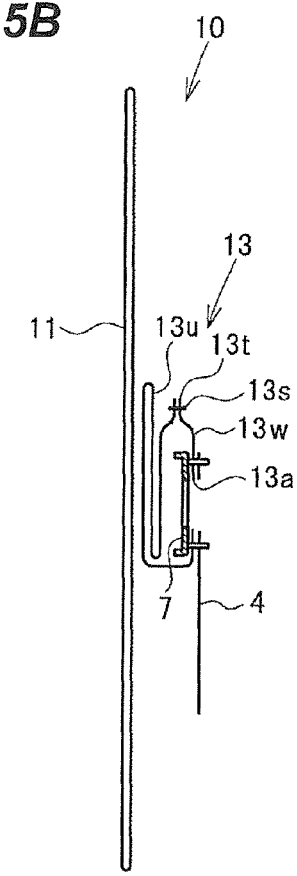
Figure 5C:
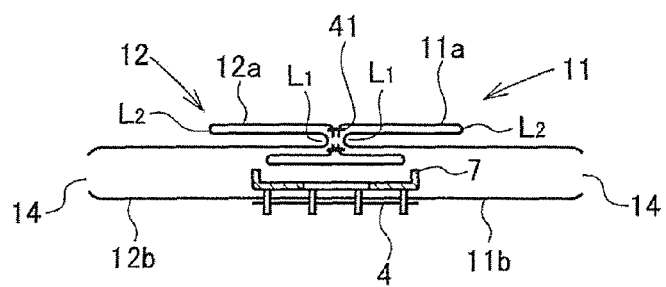
Figure 6:
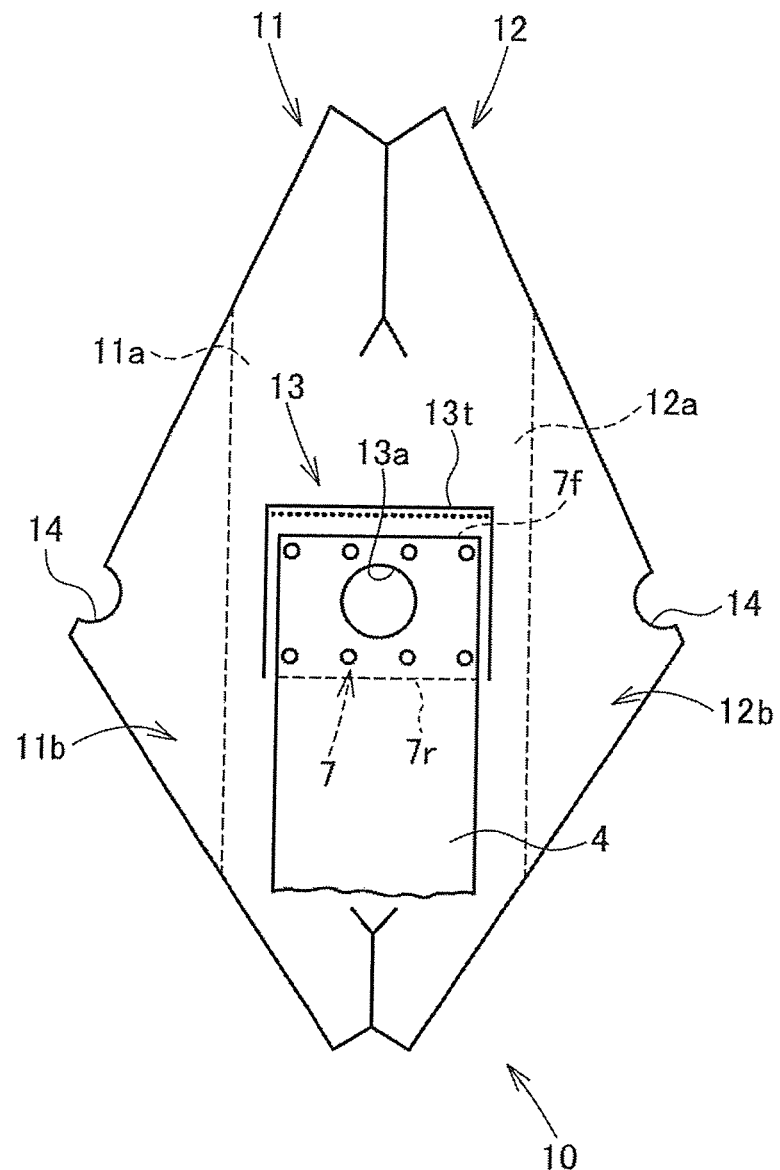
FIG. 6 is an explanatory diagram illustrating the procedure of folding of the airbag illustrated in FIG. 1.
Figure 7A:
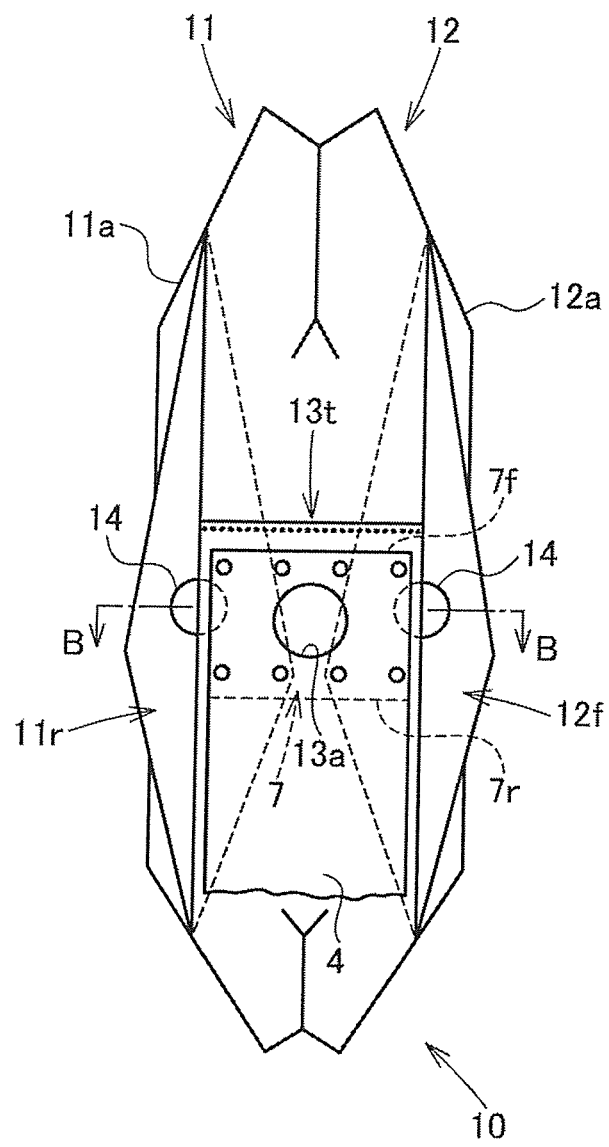
FIGS. 7A and 7B are explanatory diagrams illustrating the procedure of folding of the airbag illustrated in FIG. 1.
Figure 7B:
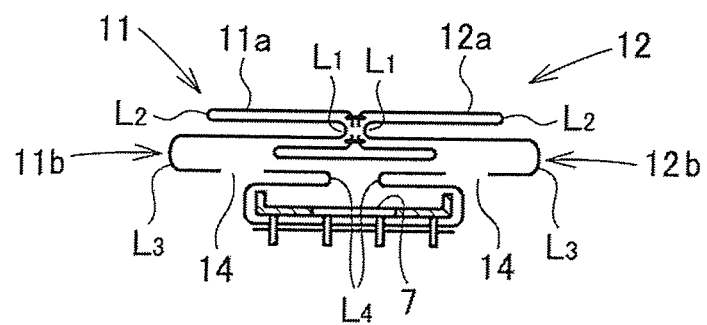
Figure 8A:
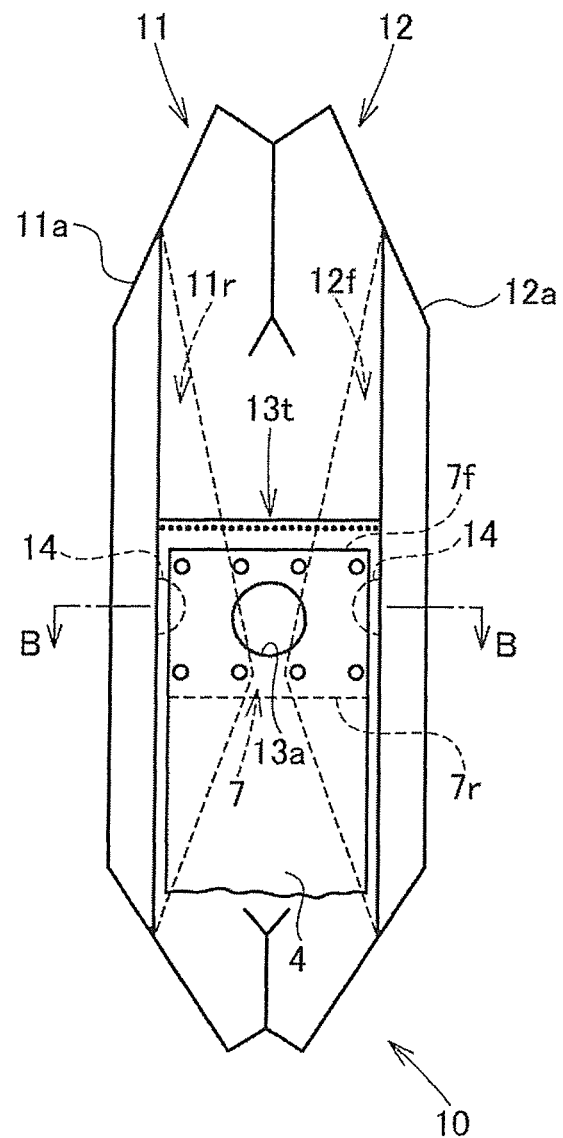
FIGS. 8A and 8B are explanatory diagrams illustrating the procedure of folding of the airbag illustrated in FIG. 1.
Figure 8B:
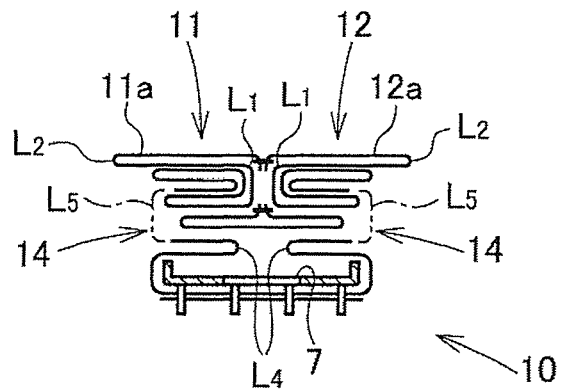
Figure 9A:
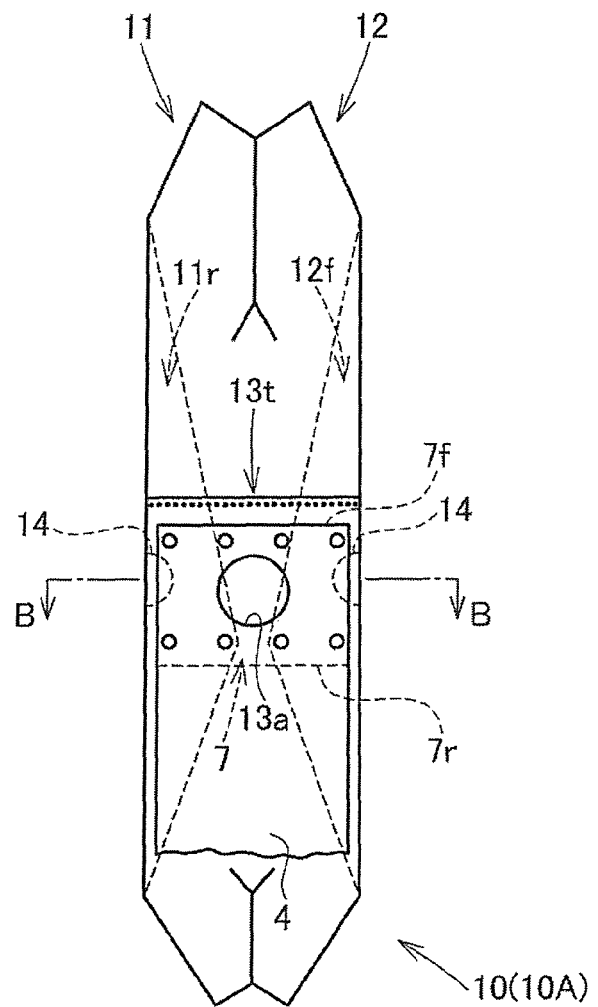
FIGS. 9A to 9C are explanatory diagrams illustrating the procedure of folding of the airbag illustrated in FIG. 1.
Figure 9B:
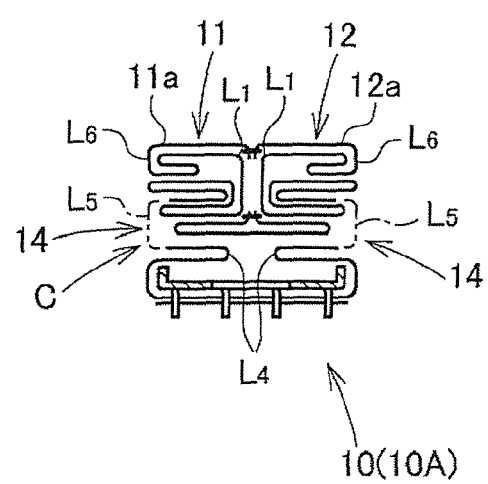
Figure 9C:
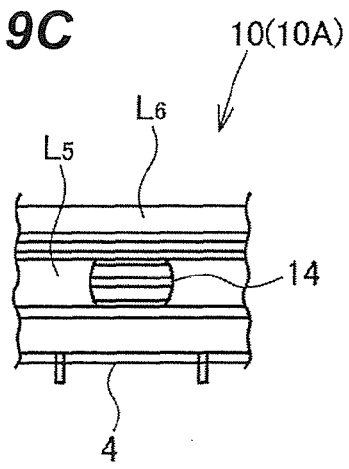
Figure 19:
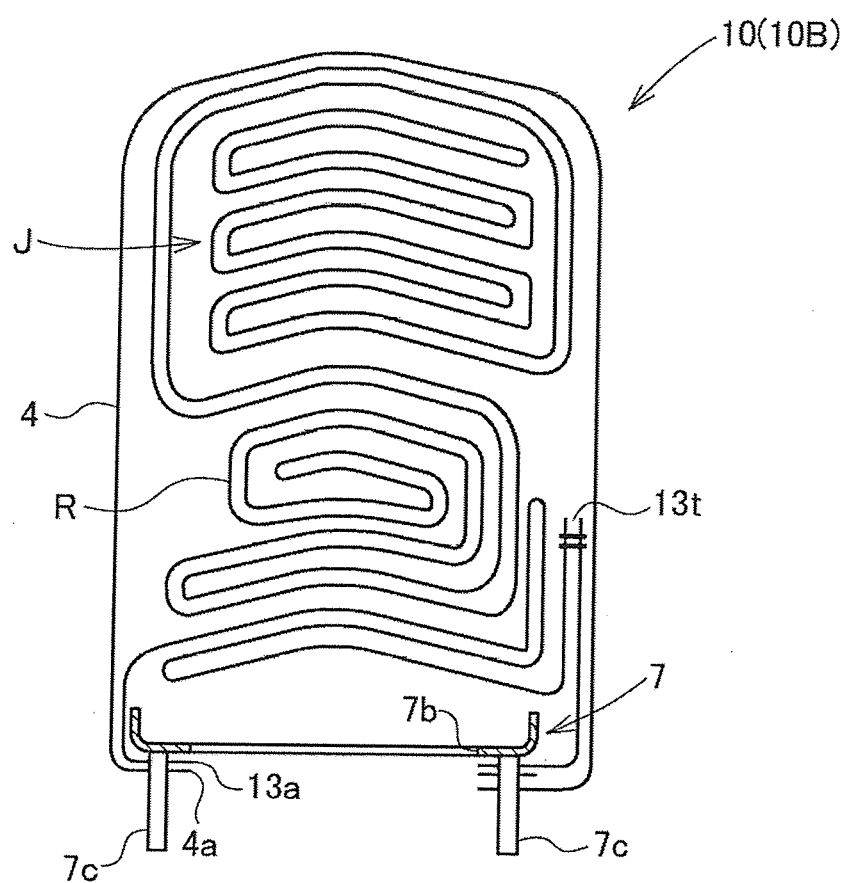
FIG. 19 is a cross-sectional view of a folded body provided by folding the airbag illustrated in FIG. 1.
Figure 20A:
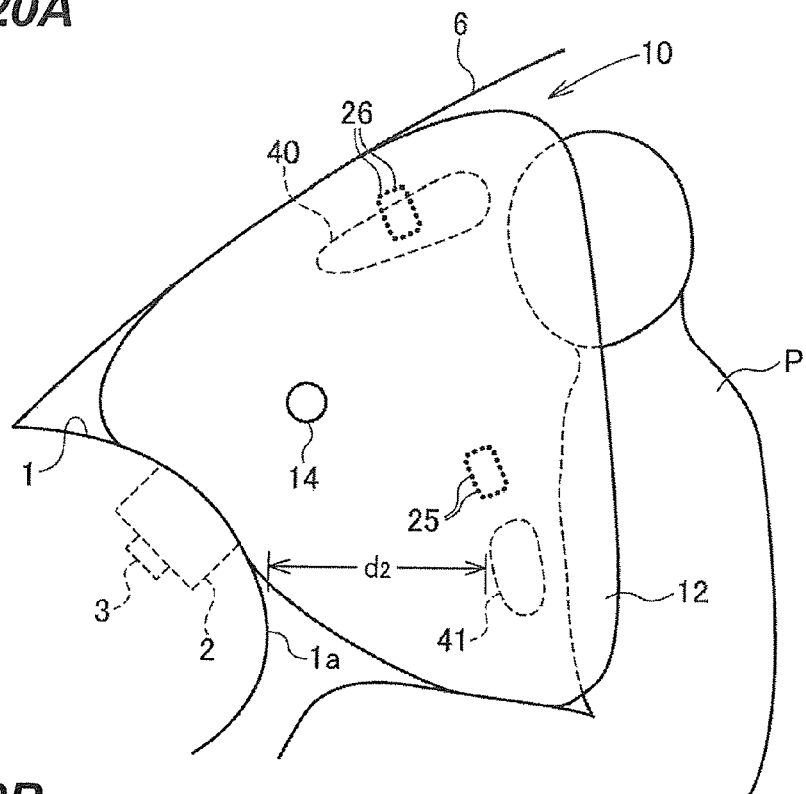
FIGS. 20A and 20B are a side view and a top view of the airbag at the time of inflation.
Figure 20B:
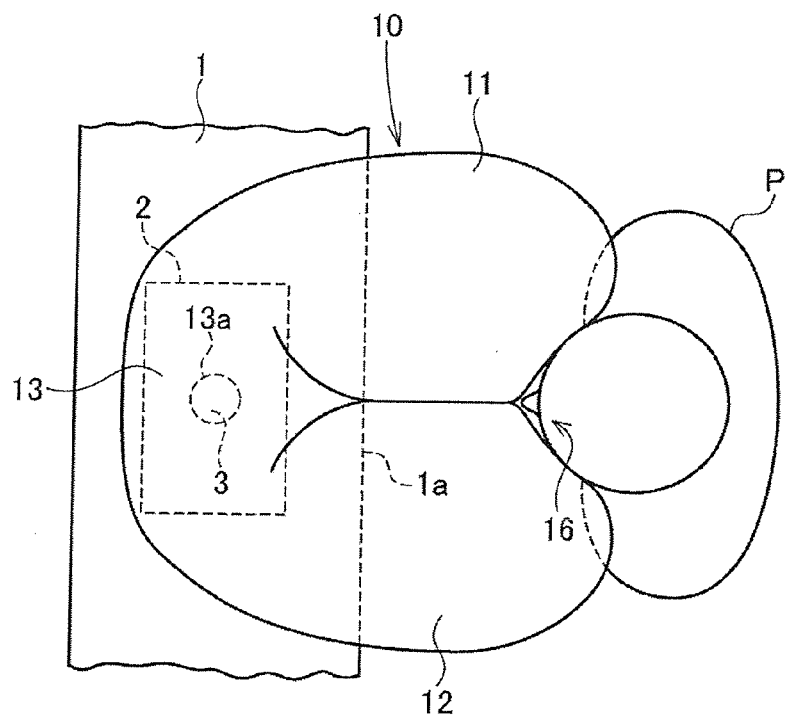
Figure 21A:
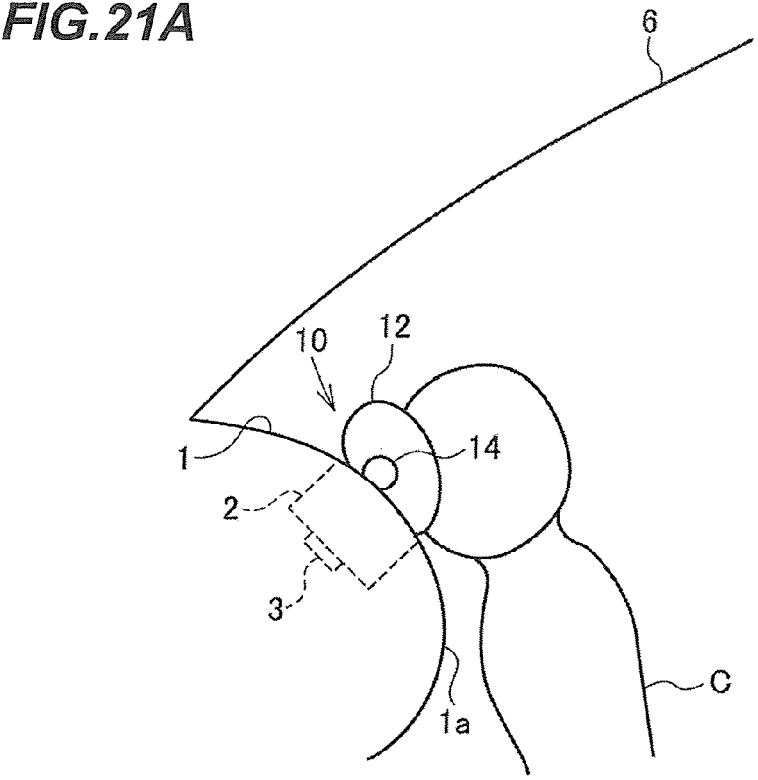
FIGS. 21A and 21B are a side view and a top view of the airbag at the time of inflation.
Figure 21B:
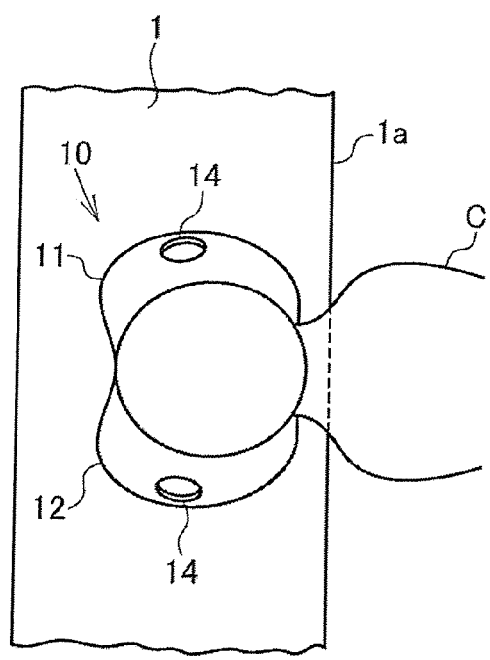
Figure 22:
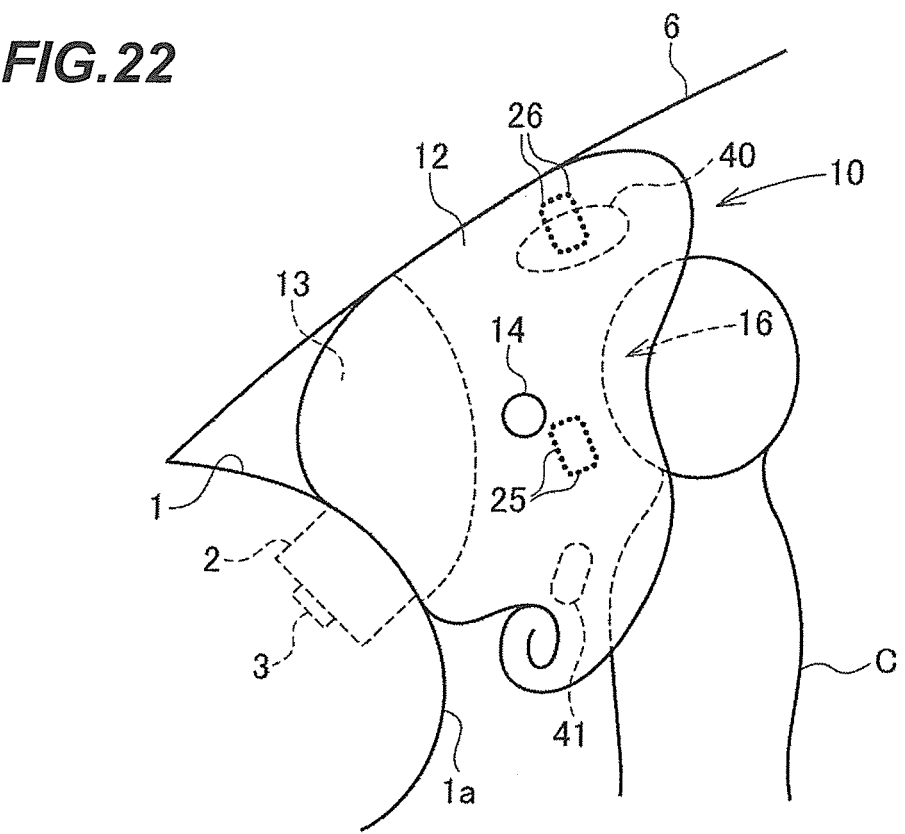
FIG. 22 is a side view illustrating a state where the airbag is expanded toward the front of an object from the state illustrated in FIGS. 21A and 21B.
Figure 23A:
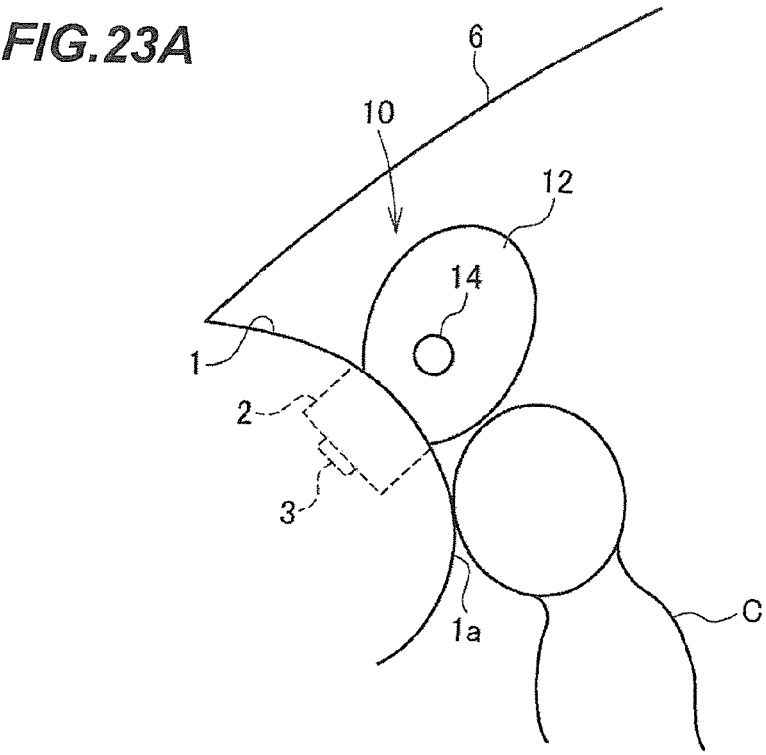
FIGS. 23A and 23B are side views of the airbag at the time of inflation.
Figure 23B:
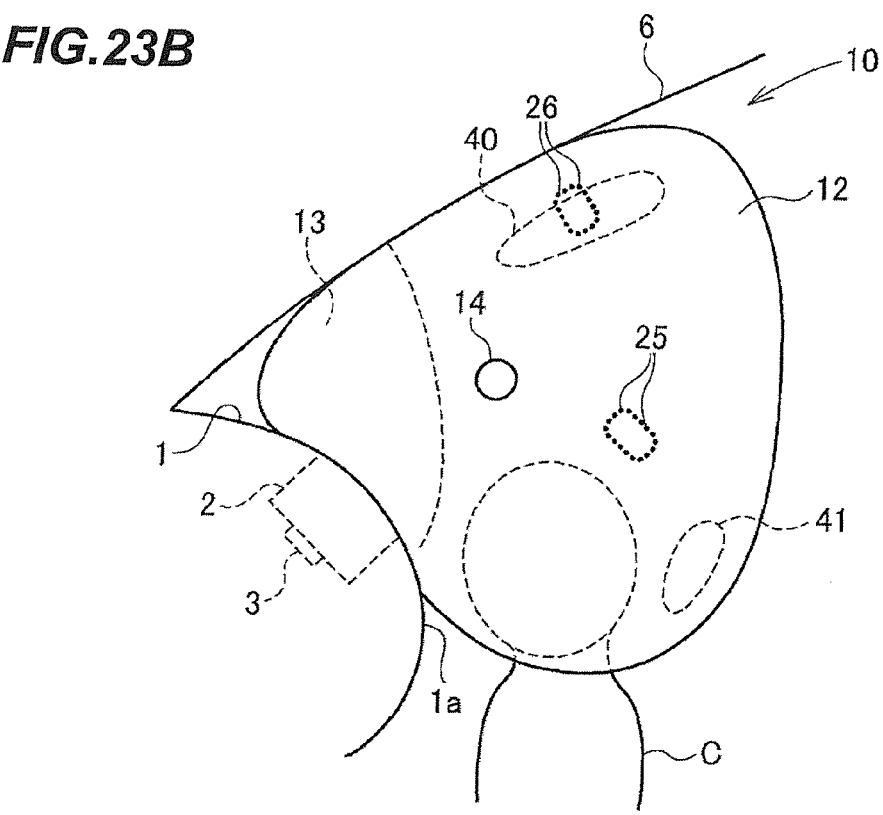
Figure 24A:
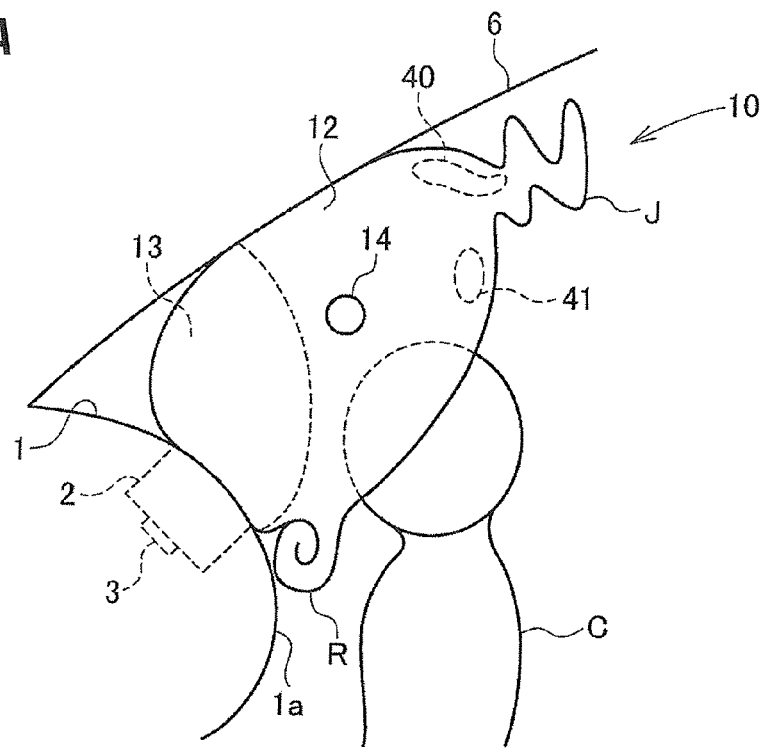
FIGS. 24A and 24B are side views of the airbag at the time of inflation.
Figure 24B:
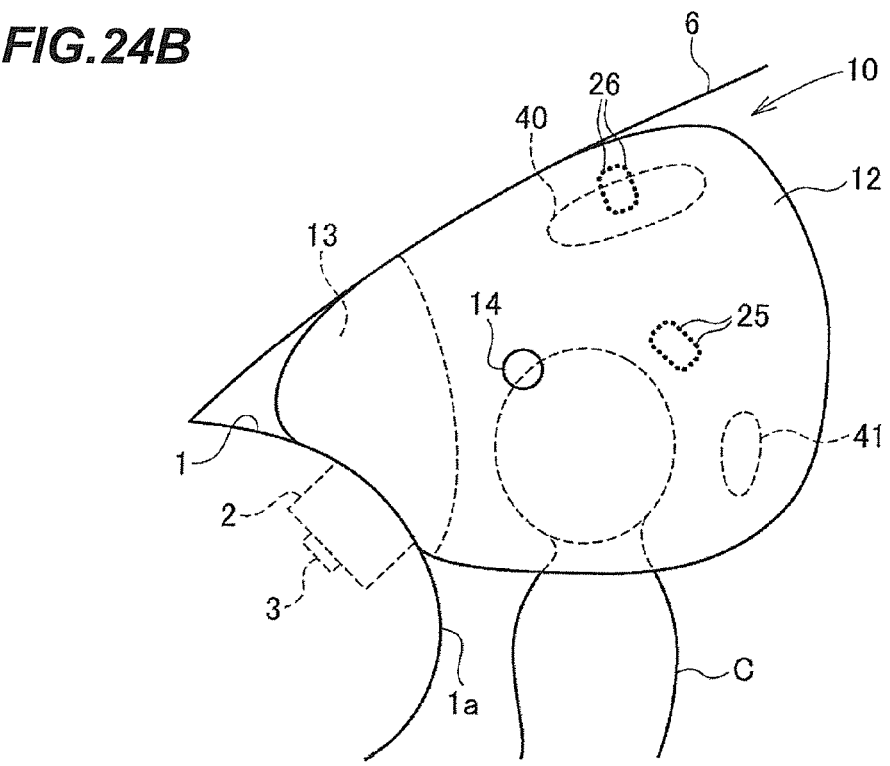

FIG. 1 is a perspective view of a passenger-side airbag (hereinafter abbreviated as an "airbag") to be folded into an airbag folded body according to an embodiment of the present invention. FIG. 2 is a cross-sectional view taken along the line II-II of FIG. 1, FIG. 3 is a cross-sectional view taken along the line III-III of FIG. 2, and FIG. 4 is a cross-sectional view taken along the line IV-IV of FIG. 2. FIGS. 5A to 5C to FIG. 18 are explanatory diagrams illustrating a procedure of folding of the airbag. FIG. 5A is a front view illustrating a first step of folding of the airbag (as viewed from an occupant), and FIGS. 5B and 5C are cross-sectional views taken along the line B-B and the line C-C of FIG. 5A, respectively. FIG. 6 is a rear view illustrating the first step of folding the airbag (as viewed from a position opposite to the occupant). FIGS. 7A, 8A and 9A are rear views illustrating respective steps of folding of the airbag. FIGS. 7B, 8B and 9B are cross-sectional views taken along the lines B-B of FIGS. 7A, 8A and 9A, respectively. FIG. 9C is a side view illustrating a region in the vicinity of a vent hole of a primary folded body of the airbag (i.e., a region C of FIG. 9B). FIGS. 10 to 18 are cross-sectional views of a region similar to that illustrated in FIG. 5B in the respective steps of folding of the airbag. FIG. 19 is a cross-sectional view of an airbag folded body in a state where folding is completed and shape retention is achieved. Note that FIG. 19 also illustrates a cross-sectional view of a region similar to that illustrated in FIG. 5B. FIG. 20A is a side view illustrating the airbag inflated in a state where the occupant sits on a normal seating position, and FIG. 20B is a top view of the airbag in this case. FIG. 21A is a side view illustrating the airbag inflated in a state where an object is present at a position that is located over an instrument panel or in the immediate vicinity thereof and is opposed to a door portion or lid of the instrument panel (note that the object includes the occupant and the same goes for the following description), and FIG. 21B is a top view of the airbag in this case. FIG. 22 is a side view illustrating a state where the airbag is expanded toward the front of the object from the state illustrated in FIG. 21A. FIGS. 23A and 23B are side views illustrating the airbag inflated in a state where the object is present at a position that is located over the instrument panel or in the immediate vicinity thereof but is not opposed to the door portion or lid of the instrument panel. FIG. 23A illustrates an initial stage of the airbag inflation, and FIG. 23B illustrates a later stage of the inflation. FIGS. 24A and 24B are side views illustrating the airbag inflated in a state where the object is present between the instrument panel and a passenger seat so as to be in the relative vicinity of the instrument panel. FIG. 24A illustrates an initial stage of the airbag inflation, and FIG. 24B illustrates a later stage of the inflation.

In the following description, "vertical direction", "longitudinal direction" and "lateral direction" mean vertical direction, longitudinal direction and lateral direction with respect to an occupant on a passenger seat, respectively. Further, "mountain-folding of an airbag" means folding performed so that a convex shape is formed toward the outside of the airbag along a fold line, and "valley-folding of an airbag" means folding performed so that a convex shape is formed toward the inside of the airbag along a fold line.

As illustrated in FIGS. 20A and 20B, a passenger-side airbag apparatus includes: a passenger-side airbag 10; a container-like retainer 2 having an opening at its upper surface, containing the folded airbag 10, and installed in an instrument panel 1 located in front of a passenger seat of a vehicle; an inflator 3 for inflating the airbag 10; and a band-like shape retention sheet 4 (FIG. 19) for retaining a shape of a folded body of the airbag 10. The reference character 6 represents a windshield located above the instrument panel 1. The retainer 2 is located inside the instrument panel 1. The instrument panel 1 is provided with a door portion (not illustrated) which is torn open to allow the airbag 10 to be swollen to the inside of a cabin at the time of inflation of the airbag 10. Note that a lid (lid member) formed separately from the instrument panel 1 may be attached to the opening at the upper surface of the retainer 2.

In this embodiment, the airbag 10 includes: a right half airbag 11 to be inflated toward the right front of the occupant on the passenger seat; a left half airbag 12 to be inflated toward the left front of the occupant on the passenger seat; and a base end chamber 13 communicated with front ends of the right half airbag 11 and the left half airbag 12 (i.e., base ends thereof with respect to an inflation direction). The base end chamber 13 is provided at its bottom surface with an inflator opening 13a into which the inflator 3 is inserted.

As clearly illustrated in FIGS. 2 and 3, a bag attachment ring 7 for connecting the airbag 10 to the retainer 2 is located inside the base end chamber 13. The bag attachment ring 7 is formed into a plate-like shape that is approximately rectangular (outer shape) in plan view, and is provided at its center with an opening 7b overlapping the inflator opening 13a. Furthermore, a plurality of stud bolts 7c are vertically provided along respective long side regions (front and rear edges 7f and 7r) of the bag attachment ring 7.

The base end chamber 13 of the airbag 10 is provided at its bottom surface with a plurality of small holes (not illustrated) at positions corresponding to the respective stud bolts 7c, and each stud bolt 7c is inserted through the corresponding small hole so as to be extended to the outside of the airbag 10. As illustrated in FIG. 2, in this embodiment, the bag attachment ring 7 is located inside the base end chamber 13 so that the longitudinal direction of the bag attachment ring 7 corresponds to the lateral direction of the airbag 10. In this embodiment, when the airbag 10 is formed into a folded body, the airbag 10 is folded so that lateral and longitudinal widths thereof are approximately similar to those of the bag attachment ring 7. Note that the shape and location of the bag attachment ring 7 are not limited to the above-described shape and location, and the size of the folded body of the airbag 10 is not limited to the above-described size.

In this embodiment, one end of the shape retention sheet 4 is sewn to a lower surface of the base end chamber 13. At the one end of the shape retention sheet 4, an opening 4a overlapping the inflator opening 13a of the base end chamber 13 is provided.

Gas ejected from the inflator 3 is introduced into the base end chamber 13 through the openings 4a and 7b and the inflator opening 13a to inflate the base end chamber 13, and then the gas flows into each of the right half airbag 11 and the left half airbag 12 from the base end chamber 13, thereby inflating the right half airbag 11 and the left half airbag 12 as illustrated in FIGS. 1 to 4.

The reference character 13t in FIG. 3 represents a front end of the base end chamber 13 of the inflated airbag 10. At the front end 13t, an upper surface panel 13u and a bottom surface panel 13w of the base end chamber 13 are sewn to each other along a seam line 13s.

A right lateral surface 11r of the right half airbag 11 and a left lateral surface 12f of the left half airbag 12 in the inflated state are each provided with a vent hole 14. Hereinafter, the right lateral surface 11r of the right half airbag 11 and the left lateral surface 12f of the left half airbag 12 may each be referred to as an "outer lateral surface", and a left lateral surface 11f of the right half airbag 11 and a right lateral surface 12r of the left half airbag 12, which are opposed to the right lateral surface 11r and the left lateral surface 12f, respectively, may each be referred to as an "inner lateral surface".

In this embodiment, inside the right half airbag 11 and the left half airbag 12, there are provided suspension cords 20 through which the right and left lateral surfaces 11r and 11f are connected to each other and the right and left lateral surfaces 12r and 12f are connected to each other at the time of inflation of the right half airbag 11 and the left half airbag 12. Note that in FIG. 1, the illustration of the suspension cord 20 inside the right half airbag 11 is omitted. The suspension cords 20 are provided so that in a state where the right half airbag 11 and the left half airbag 12 are inflated, portions of the lateral surfaces 11r and 11f, located somewhere along the longitudinal direction, are connected to each other, and portions of the lateral surfaces 12r and 12f, located somewhere along the longitudinal direction, are connected to each other. The portions of the lateral surfaces, connected to each other through the suspension cords 20, are preferably located at positions 150 mm to 450 mm (in particular, 200 mm to 350 mm) away from rearmost ends 11t and 12t (FIG. 2) of the right half airbag 11 and the left half airbag 12 toward the base ends thereof.

As illustrated in FIG. 4, according to this embodiment, in the state where the right half airbag 11 and the left half airbag 12 are inflated, each suspension cord 20 has: a lateral connector 21 through which the lateral surfaces 11f and 11r or the lateral surfaces 12f and 12r are substantially horizontally connected to each other in the lateral direction; and an oblique connector 22 through which the lateral surfaces 11f and 11r or the lateral surfaces 12f and 12r are connected to each other in an oblique direction.

In the state where the right half airbag 11 and the left half airbag 12 are inflated, each lateral connector 21 connects vertical intermediate portions of the lateral surfaces 11f and 11r or the lateral surfaces 12f and 12r to each other. The portions of the lateral surfaces, connected to each other through each lateral connector 21, are preferably located at heights of 30% to 65% (in particular, 35% to 55%) of the total height of the right half airbag 11 or the left half airbag 12, which are measured from the lowermost portion of the right half airbag 11 or the left half airbag 12.

In the state where the right half airbag 11 and the left half airbag 12 are inflated, one end of each oblique connector 22 is connected to a vertical intermediate portion of the inner lateral surface 11f of the right half airbag 11 or the inner lateral surface 12r of the left half airbag 12. The connected portion in this case is preferably located at a height of 30% to 65% (in particular, 35% to 55%) of the total height of the right half airbag 11 or the left half airbag 12, which is measured from the lowermost portion of the right half airbag 11 or the left half airbag 12. The other end of each oblique connector 22 is connected to an upper portion of the outer lateral surface 11r of the right half airbag 11 or the outer lateral surface 12f of the left half airbag 12. The connected portion in this case is preferably located at a height of 60% to 90% (in particular, 65% to 85%) of the total height of the right half airbag 11 or the left half airbag 12, which is measured from the lowermost portion of the right half airbag 11 or the left half airbag 12.

In this embodiment, the lateral connectors 21 each have: an inner half body 21a connected to the inner lateral surface 11f or 12r; and an outer half body 21b connected to the outer lateral surface 11r or 12f, and the oblique connectors 22 each have: an inner half body 22a connected to the inner lateral surface 11f or 12r; and an outer half body 22b connected to the outer lateral surface 11r or 12f.

In this embodiment, one end of the inner half body 21a of each lateral connector 21 and that of the inner half body 22a of each oblique connector 22 are continuous with a common base piece 23. Specifically, in this embodiment, the inner half bodies 21a of the lateral connectors 21 and the inner half bodies 22a of the oblique connectors 22 are formed so as to be continuous and integral with each other via the base pieces 23. The base pieces 23 are connected to the inner lateral surfaces 11f and 12r via a connecting means such as sewing, thereby connecting the one ends of the inner half bodies 21a and 22a to the inner lateral surfaces 11f and 12r. The reference character 24 represents a seam (seam line) along which the base pieces 23 are sewn to the inner lateral surfaces 11f and 12r. Note that the inner half bodies 21a of the lateral connectors 21 and the inner half bodies 22a of the oblique connectors 22 may be formed separately and may be separately connected to the inner lateral surfaces 11f and 12r. Reinforcing cloths may be provided between the inner half bodies 21a and 22a and the inner lateral surfaces 11f and 12r.

In this embodiment, as illustrated in FIG. 2, the base piece 23 of the suspension cord 20 located inside the right half airbag 11, the inner lateral surfaces 11f and 12r, and the base piece 23 of the suspension cord 20 located inside the left half airbag 12 are stacked in four layers and integrally sewn along the seam 24. In other words, in this embodiment, portions of the inner lateral surfaces 11f and 12r of the right half airbag 11 and the left half airbag 12, which are located somewhere along the longitudinal direction, and vertical intermediate portions of the inner lateral surfaces 11f and 12r of the right half airbag 11 and the left half airbag 12 are also connected to each other along the seam 24.

As illustrated in FIG. 2, a front end of the seam 24 is located away from a rear end of the base end chamber 13, and a hollow region 15, in which the inner lateral surfaces 11f and 12r are not connected to each other, exists between the front end of the seam 24 and the rear end of the base end chamber 13. A distance measured from the front end of the seam 24 to the rear end of the base end chamber 13 in a state where the inflation of the airbag 10 is completed is preferably 100 mm to 400 mm and particularly preferably 160 mm to 350 mm.

The outer half bodies 21b of the lateral connectors 21 and the outer half bodies 22b of the oblique connectors 22 are connected at one ends thereof to the outer lateral surfaces 11r and 12f via a connecting means such as sewing. The reference characters 25 and 26 represent seams along which the outer half bodies 21b and 22b are sewn to the outer lateral surfaces 11r and 12f. In this embodiment, the one ends of the outer half bodies 21b and 22b are sewn to the outer lateral surfaces 11r and 12f with reinforcing cloths 27 and 28 interposed therebetween. Note that in this embodiment, the reinforcing cloths 27 and 28 are formed so as to be continuous with the outer half bodies 21b and 22b, respectively, and the reinforcing cloths 27 and 28 are folded back and located between the one ends of the outer half bodies 21b and 22b and the outer lateral surfaces 11r and 12f; however, the reinforcing cloths 27 and 28 are not limited to the foregoing structures.

The other ends of the inner half bodies 21a and those of the outer half bodies 21b are connected to each other via a connecting means such as sewing, and the other ends of the inner half bodies 22a and those of the outer half bodies 22b are connected to each other via a connecting means such as sewing. Thus, through the lateral connectors 21 and the oblique connectors 22, the right and left lateral surfaces 11r and 11f of the right half airbag 11 are connected to each other, and the right and left lateral surfaces 12r and 12f of the left half airbag 12 are connected to each other. The reference characters 29 represent seams along which the other ends of the half bodies 21a and 21b are sewn to each other, and the reference characters 30 represent seams along which the other ends of the half bodies 22a and 22b are sewn to each other.

In this embodiment, at positions above and below the seam 24, the inner lateral surface 11f of the right half airbag 11 and the inner lateral surface 12r of the left half airbag 12 are further partially sewn to each other along seams 40 and 41. As illustrated in FIGS. 3 and 4, the seams 40 and 41 are each extended in an annular form. The upper seam 40 is formed into an approximately elliptical shape extended approximately longitudinally along the upper sides of the inner lateral surfaces 11f and 12r, and the lower seam 41 is formed into an approximately elliptical shape extended approximately vertically along the rear sides of the inner lateral surfaces 11f and 12r (i.e., the sides thereof closer to the occupant). At positions located inwardly of the seams 40 and 41, there are provided communication holes 42 and 43 which pass through the inner lateral surfaces 11f and 12r and through which the inside of the right half airbag 11 and the inside of the left half airbag 12 are communicated with each other. The seams 40 and 41 surround the entire perimeters of the communication holes 42 and 43, respectively, so that gas will not leak to the outside of the airbag 10 through a gap between edge portions of the inner lateral surfaces 11f and 12r, bordering the communication holes 42 and 43.

As illustrated in FIGS. 2 to 4, rear ends of the seams 40 and 41 are located forwardly away from the rear sides of the inner lateral surfaces 11f and 12r (i.e., the sides thereof closer to the occupant). Further, an upper end of the upper seam 40 is located downwardly away from the upper sides of the inner lateral surfaces 11f and 12r, and a lower end of the lower seam 41 is located upwardly away from the lower sides of the inner lateral surfaces 11f and 12r. Thus, in the state where the right half airbag 11 and the left half airbag 12 are inflated, a continuous concave region 16 is formed between upper surfaces, lower surfaces and rear surfaces (occupant-facing surfaces) 11j and 12j of the right half airbag 11 and the left half airbag 12. A rear end of the seam 24 is located forwardly of the rear ends of the seams 40 and 41.

Front ends of the seams 40 and 41 are each located away from the rear end of the base end chamber 13, and the hollow region 15 is passed through a gap therebetween so as to be opened toward upper and lower surfaces of the airbag 10. Thus, the hollow region 15 approximately vertically passes through a gap between the right half airbag 11 and the left half airbag 12. Furthermore, the hollow region 15 passes through gaps between the seams 40 and 41 and the seam 24 so that the hollow region 15 is also communicated with a part of the concave region 16, located adjacent to the occupant-facing surfaces 11j and 12j of the right half airbag 11 and the left half airbag 12.

As illustrated in FIGS. 20A, 23B and 24B, in the state where the inflation of the airbag 10 is completed, the lower seam 41 is provided so that the front end thereof is located closer to the rear of the vehicle relative to a rearmost end 1a of the instrument panel 1. Thus, in the state where the inflation of the airbag 10 is completed, a lower end opening of the hollow region 15 (which is located between the front end of the seam 41 and the rear end of the base end chamber 13) is at least partially exposed at the lower surface of the airbag 10 at a position located closer to the rear of the vehicle relative to the rearmost end 1a of the instrument panel 1. Accordingly, as illustrated in FIGS. 23B and 24B, even when an object C is present between the instrument panel 1 and the passenger seat (not illustrated) so as to be in the relative vicinity of the instrument panel 1 upon inflation of the airbag 10 (e.g., when a child occupant stands on a floor between the instrument panel 1 and the passenger seat), the object C will be swallowed up by the hollow region 15.

A horizontal distance $d_2$ (FIG. 20A) between the front end of the lower seam 41 and the rearmost end 1a of the instrument panel 1 in the state where the inflation of the airbag 10 is completed is preferably 100 mm to 300 mm and particularly preferably 160 mm to 250 mm.

In the state where the inflation of the airbag 10 is completed, a distance measured from the occupant-facing surfaces 11j and 12j of the right half airbag 11 and the left half airbag 12 to the rear ends of the seams 40 and 41 (i.e., a depth of the concave region 16 at a position adjacent to the occupant-facing surfaces 11j and 12j) is preferably 10 mm to 200 mm and particularly preferably 30 mm to 150 mm, a distance measured from the upper surfaces of the right half airbag 11 and the left half airbag 12 to the upper end of the seam 40 (i.e., a depth of the concave region 16 at a position adjacent to the upper surface of the airbag) is preferably 10 mm to 150 mm and particularly preferably 20 mm to 80 mm, and a distance measured from the lower surfaces of the right half airbag 11 and the left half airbag 12 to the lower end of the seam 41 (i.e., a depth of the concave region 16 at a position adjacent to the lower surface of the airbag) is preferably 10 mm to 200 mm and particularly preferably 30 mm to 150 mm. A distance measured from the occupant-facing surfaces 11j and 12j to the rear end of the seam 24 is preferably 100 mm to 450 mm and particularly preferably 200 mm to 350 mm. A distance measured from a lower end of the seam 40 to an upper end of the seam 24 is preferably 50 mm to 350 mm and particularly preferably 70 mm to 250 mm, and a distance measured from a lower end of the seam 24 to an upper end of the seam 41 is preferably 10 mm to 250 mm and particularly preferably 20 mm to 170 mm. A distance measured from the front end of the seam 40 to the rear end of the base end chamber 13 is preferably 30 mm to 250 mm and particularly preferably 50 mm to 150 mm.

In the state where the inflation of the airbag 10 is completed, no bridge member such as a tie panel exists between rear ends of the right half airbag 11 and the left half airbag 12, and the concave region 16 is opened toward the occupant (i.e., toward the right in FIGS. 1 to 3). In the state where the inflation of the airbag 10 is completed, a distance W (see FIG. 2) between the rearmost end 11t of the right half airbag 11 and the rearmost end 12t of the left half airbag 12 is preferably 150 mm to 450 mm and particularly preferably 170 mm to 430 mm.

[Method for Folding Airbag 10]

When the airbag 10 is folded, the following steps are carried out. First, as illustrated in FIGS. 5A to 5C to FIGS. 9A to 9C, longitudinal thicknesses of the right half airbag 11 and the left half airbag 12 are reduced, and right and left end portions thereof are folded along vertical fold lines, thereby providing a vertically long primary folded body 10A (primary folding process); then, as illustrated in FIGS. 10 to 18, the primary folded body 10A is folded along lateral fold lines, thereby providing a final folded body 10B (secondary folding process). Hereinafter, the method for folding the airbag 10 will be described in detail.

[Primary Folding Process]

When the primary folding of the airbag 10 is carried out, the airbag 10 is placed on a flat horizontal bench, a bottom surface (bag attachment ring 7) of the base end chamber 13 is abutted against the bench, and then portions of the airbag 10, which are located between the bottom surface of the base end chamber 13 and the occupant-facing surfaces 11$j$ and 12$j$, are pulled and spread out in longitudinal and lateral directions of the bench (i.e., in a horizontal direction thereof).

Subsequently, as illustrated in FIG. 5B, the upper surface panel 13$u$ of the base end chamber 13 is folded so as to be superposed over the bag attachment ring 7.

Next, as illustrated in FIG. 5C, portions of the outer lateral surfaces 11$r$ and 12$f$ of the right half airbag 11 and the left half airbag 12, which are located closer to the occupant relative to the vent holes 14, are each valley-folded along a fold line $L_1$ extended vertically at the time of inflation of the airbag 10 (which will hereinafter be simply referred to as a "vertical fold line"); in addition, portions of the outer lateral surfaces 11$r$ and 12$f$ of the right half airbag 11 and the left half airbag 12, which are located closer to the occupant relative to the fold lines $L_1$, are each mountain-folded along a vertical fold line $L_2$. As a result, the airbag 10 placed on the bench is formed into a spread body flatly spread out so that the longitudinal thickness thereof when the airbag 10 will be inflated is reduced. FIG. 5A is a diagram illustrating the spread body of the airbag 10 as viewed from above the bench, and FIG. 6 is a diagram illustrating the spread body as viewed from below the bench in a see-through manner. As illustrated in FIGS. 5A and 5C, the spread body has: flaps 11$a$ and 12$a$ located closer to the occupant relative to the fold lines $L_1$ (i.e., opposite to the bench); and flaps 11$b$ and 12$b$ located opposite to the occupant (i.e., adjacent to the bench).

As illustrated in FIG. 6, the base end chamber 13 is folded over a surface of the spread body opposite to the occupant (i.e., a surface of the spread body adjacent to the bench) so that the front end 13$t$ of the base end chamber 13 at the time of inflation thereof faces upper ends of the flaps 11$b$ and 12$b$ at the time of the inflation, and the inflator opening 13$a$ at the bottom surface of the base end chamber 13 is exposed at the surface of the spread body, which is opposite to the occupant. Inside the base end chamber 13, the bag attachment ring 7 is located so that the front edge 7$f$ faces the upper ends of the flaps 11$b$ and 12$b$ at the time of the inflation, and the rear edge 7$r$ faces lower ends of the flaps 11$b$ and 12$b$ at the time of the inflation.

As illustrated in FIG. 5A and FIG. 6, in the spread body, each vent hole 14 is preferably at least partially located at a position that is closer to the lower end of the flap 11$b$ or 12$b$ relative to the front edge 7$f$ of the bag attachment ring 7 and closer to the upper end of the flap 11$b$ or 12$b$ relative to the rear edge 7$r$ of the bag attachment ring 7.

Next, as illustrated in FIGS. 7A and 7B, portions of the flaps 11$b$ and 12$b$, located closer to the occupant relative to the vent holes 14, are each mountain-folded along a vertical fold line $L_3$, and portions of the flaps 11$b$ and 12$b$, located between the fold lines $L_3$ and the bag attachment ring 7, are each valley-folded along a vertical fold line $L_4$. In this case, as illustrated in FIG. 7A, the respective vent holes 14 overlap right and left sides of the bag attachment ring 7.

In this state, as illustrated in FIG. 7B, portions of the flaps 11$b$ and 12$b$, located in the vicinity of the fold lines $L_3$, are greatly laterally projected relative to the bag attachment ring 7. Hence, as illustrated in FIG. 8B, the portions of the flaps 11$b$ and 12$b$, located in the vicinity of the fold lines $L_3$, are mountain-folded along vertical fold lines $L_5$, longitudinally traversing the vent holes 14, so as to be folded back toward the fold lines $L_1$ and interfolded toward rear surfaces of the flaps 11$a$ and 12$a$. In this case, the interfolded regions are appropriately folded in a zigzag manner or in a roll-like manner along vertical fold lines (reference characters thereof are omitted), thereby preventing the interfolded regions from being greatly laterally projected relative to the bag attachment ring 7.

As a result of the folding steps illustrated in FIGS. 7A and 7B and FIGS. 8A and 8B, each vent hole 14 is located in the vicinity of the vertex of a mountain-folded region formed along the fold line $L_5$.

Subsequently, as illustrated in FIG. 9B, tips of the flaps 11$a$ and 12$a$, greatly laterally projected relative to the bag attachment ring 7, are folded back toward the rear surfaces thereof along vertical fold lines $L_6$. In this case, when necessary, the folded-back regions are also appropriately folded in a zigzag manner or in a roll-like manner along vertical fold lines, thereby preventing the folded-back regions from being greatly laterally projected relative to the bag attachment ring 7.

As a result of folding the airbag 10 as described above, the airbag 10 is formed into the vertically long primary folded body 10A as illustrated in FIG. 9A. A lateral width of the primary folded body 10A is substantially equal to that of the bag attachment ring 7.

In the primary folded body 10A, each vent hole 14 is located in the vicinity of the vertex of the mountain-folded region formed along the fold line L5, and thus the vent holes 14 are exposed at right and left lateral surfaces of the primary folded body 10A.

[Secondary Folding Process]

The vertically long primary folded body 10A is subjected to secondary folding so that a vertical width thereof is reduced as illustrated in FIGS. 10 to 18, thereby providing the final folded body 10B.

Figure 10:
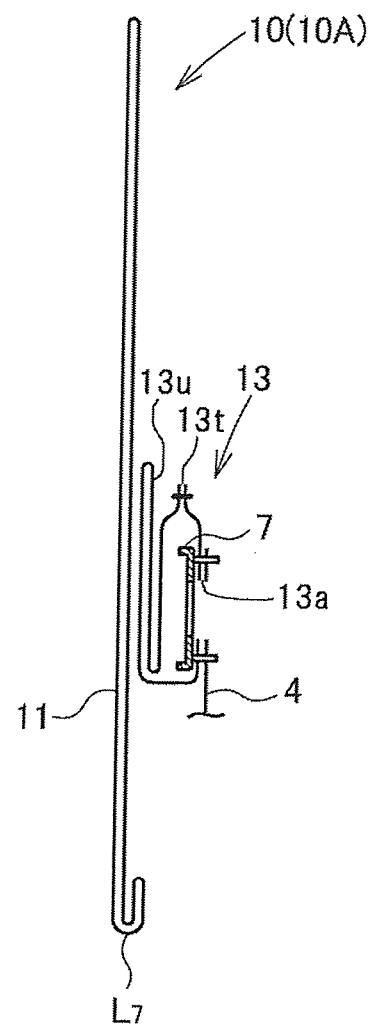
FIG. 10 is an explanatory diagram illustrating the procedure of folding of the airbag illustrated in FIG. 1.
Figure 11:
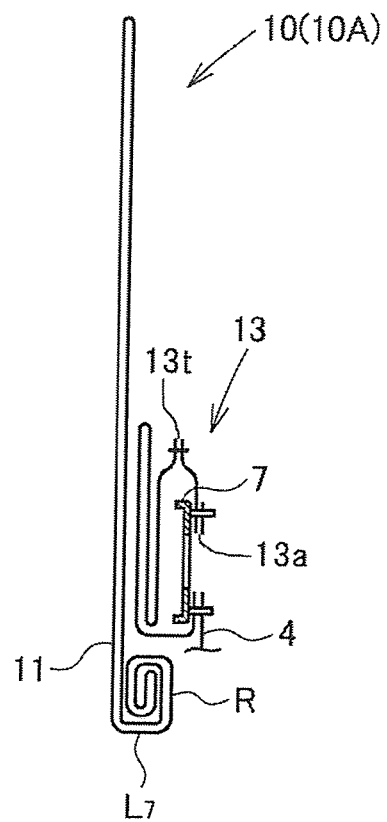
FIG. 11 is an explanatory diagram illustrating the procedure of folding of the airbag illustrated in FIG. 1.

Specifically, as illustrated in FIGS. 10 and 11, a lower end portion of the vertically long primary folded body 10A is first folded in a roll-like manner toward a rear surface of the primary folded body 10A along a lateral fold line $L_7$, thus providing a roll folded body R.

Figure 12:
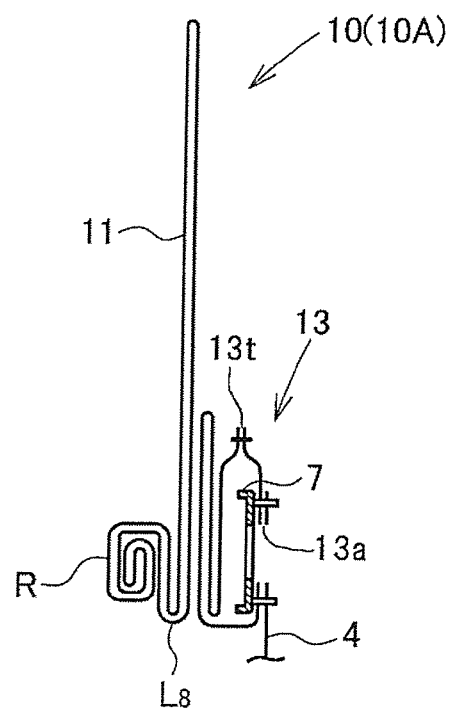
FIG. 12 is an explanatory diagram illustrating the procedure of folding of the airbag illustrated in FIG. 1.

Subsequently, as illustrated in FIG. 12, the lower end portion of the primary folded body 10A is folded back toward a front surface thereof along a lateral fold line $L_8$, and thus the roll folded body R is superposed over the bag attachment ring 7.

Figure 13:
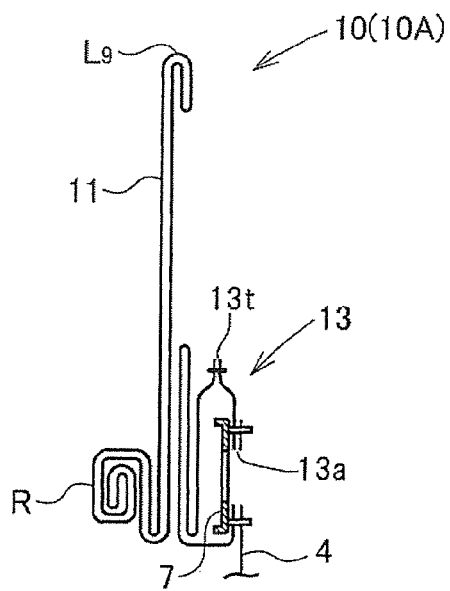
FIG. 13 is an explanatory diagram illustrating the procedure of folding of the airbag illustrated in FIG. 1.
Figure 14:
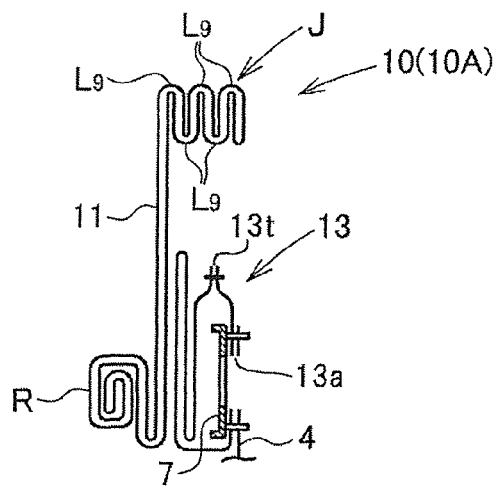
FIG. 14 is an explanatory diagram illustrating the procedure of folding of the airbag illustrated in FIG. 1.

Then, as illustrated in FIGS. 13 to 14, an upper end portion of the primary folded body 10A is folded in a bellows-like manner along lateral fold lines $L_9$, thus providing a bellows folded body J.

Figure 15:
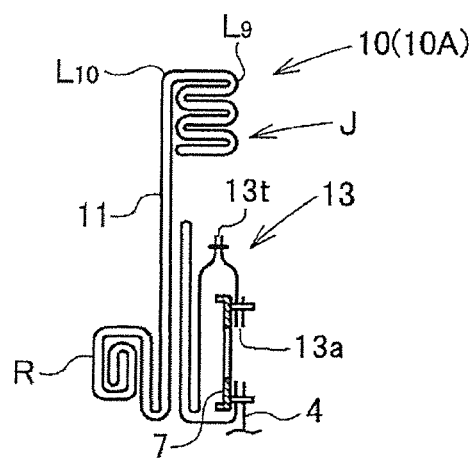
FIG. 15 is an explanatory diagram illustrating the procedure of folding of the airbag illustrated in FIG. 1.
Figure 16:
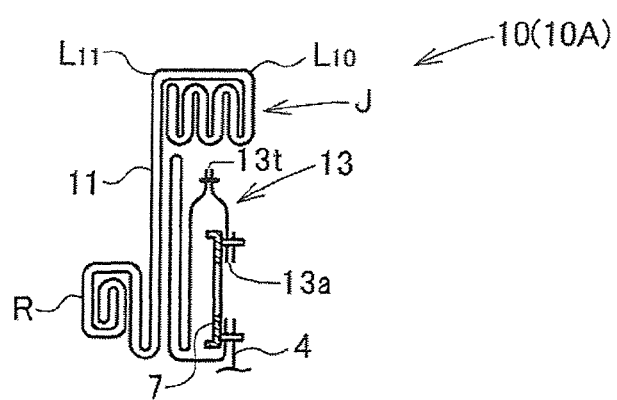
FIG. 16 is an explanatory diagram illustrating the procedure of folding of the airbag illustrated in FIG. 1.
Figure 17:
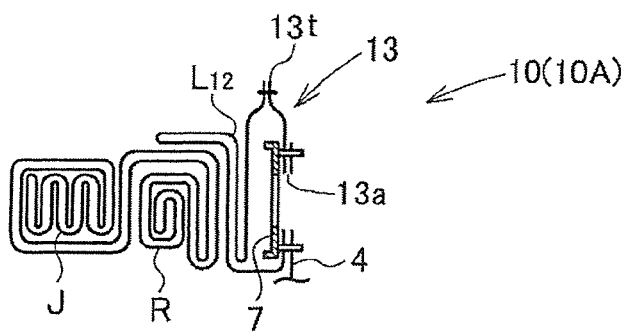
FIG. 17 is an explanatory diagram illustrating the procedure of folding of the airbag illustrated in FIG. 1.

Next, as illustrated in FIGS. 15 and 16, the bellows folded body J is folded back toward the rear surface along lateral fold lines $L_{10}$ and $L_{11}$; then, as illustrated in FIG. 17, the bellows folded body J is folded back toward the front surface along a lateral fold line $L_{12}$ and is thus superposed over the roll folded body R.

Figure 18:
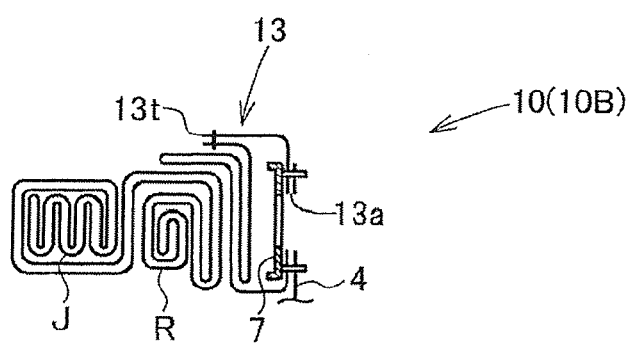
FIG. 18 is an explanatory diagram illustrating the procedure of folding of the airbag illustrated in FIG. 1.

Subsequently, as illustrated in FIG. 18, a region of the base end chamber 13, located closer to the front end 13t relative to the bag attachment ring 7, is allowed to run along a lateral surface of the roll folded body R. As a result, the airbag 10 is formed into the block-like final folded body 10B.

Then, as illustrated in FIG. 19, the shape retention sheet 4 is wound around the final folded body 10B, and small holes (reference characters thereof are omitted) provided at a tip of the shape retention sheet 4 are engaged with the stud bolts 7c of the bag attachment ring 7. Thus, the shape of the final folded body 10B is retained by the shape retention sheet 4. As illustrated in FIG. 19, the bellows folded body J is located above the roll folded body R.

The final folded body 10B is formed into a block-like shape by folding the primary folded body 10A along the lateral fold lines $L_7$ to $L_{12}$. Accordingly, similarly to FIG. 9B, the vent holes 14 are also exposed at right and left lateral surfaces of the final folded body 10B.

In the folded body 10B of the airbag 10, the inflator 3 is inserted into the openings 4a and 7b and the inflator opening 13a, and the bag attachment ring 7 is connected to a bottom surface of the retainer 2 (FIGS. 20A and 20B to FIGS. 24A and 24B) via the stud bolts 7c in an airbag apparatus assembly process, thereby forming the passenger-side airbag apparatus. Note that as mentioned above, a lid (not illustrated) is attached to the opening at the upper surface of the retainer 2 when necessary.

The passenger-side airbag apparatus including the airbag 10 is operated as follows.

Upon collision of a vehicle equipped with the airbag apparatus, the inflator 3 is operated to eject gas. The gas ejected from the inflator 3 is first introduced into the base end chamber 13 to inflate the base end chamber 13. Due to an inflation pressure of the airbag 10, the shape retention sheet 4 is ruptured, and the door portion (or lid) of the instrument panel 1 is torn open to form an opening for swelling of the airbag; thus, the airbag 10 is swollen to the inside of a cabin through this opening.

The gas introduced into the base end chamber 13 then flows into the right half airbag 11 and the left half airbag 12, thereby causing swelling of the right half airbag 11 and the left half airbag 12.

As illustrated in FIG. 19, inside the retainer 2, the bellows folded body J formed by folding upper end parts of the right half airbag 11 and the left half airbag 12 is located above the roll folded body R formed by folding lower end parts of the right half airbag 11 and the left half airbag 12; therefore, the upper end parts of the right half airbag 11 and the left half airbag 12 will start to spread into the cabin and expand toward the front of an occupant at an early stage. Since bellows folding allows quicker expansion as compared with roll folding, the bellows folded body J will be quickly expanded upward. The roll folded body R is expanded so as to be interposed between the instrument panel 1 and the occupant while being rolled along a front surface of the occupant's body.

As illustrated in FIGS. 20A and 20B, when the occupant is sitting on a normal seating position, the right half airbag 11 is inflated toward the right front of the occupant, and the left half airbag 12 is inflated toward the left front of the occupant. Then, the inflated right half airbag 11 receives the right chest of the occupant, the inflated left half airbag 12 receives the left chest of the occupant, and a region of the occupant's body, in the vicinity of the breastbone, is opposed to the concave region 16 located between the right half airbag 11 and the left half airbag 12. Hence, a reaction force applied to the region in the vicinity of the breastbone when the airbag receives the occupant's body will be reduced. Further, the head of the occupant is penetrated into and received by the concave region 16. In this case, gas inside the right half airbag 11 and the left half airbag 12 is discharged through the vent holes 14, thereby absorbing an impact applied to the occupant.

In the folded body 10B of the airbag 10, the vent holes 14 are exposed at the right and left lateral surfaces of the folded body 10B. Therefore, as illustrated in FIGS. 21A and 21B, when the inflation of the airbag 10 is started in the state where the object C such as the occupant is present at a position located over the instrument panel 1 or in the immediate vicinity thereof and opposed to the door portion or lid of the instrument panel 1, the vent holes 14 are exposed to the atmosphere upon swelling of the airbag 10 into the cabin and contact of the airbag 10 with the object C. Hence, gas quickly flows out of the airbag 10 through the vent holes 14, and a force applied to the object C from the airbag 10 will be reduced. Then, as illustrated in FIG. 22, the airbag 10 expands toward the front of the object C to restrain the object C without excessively pressing the object C toward the rear of the vehicle.

In this embodiment, as illustrated in FIG. 7B, portions of the airbag outer lateral surfaces 11r and 12f, located between the vent holes 14 and the bag attachment ring 7, are each folded into the inside of the airbag along the fold line $L_4$ just once; hence, at the time of inflation of the airbag 10, portions of the airbag 10, located between the bag attachment ring 7 and the vent holes 14, are quickly unfolded, so that portions of the airbag 10, located in the vicinity of the vent holes 14, are rapidly moved to positions above the instrument panel 1 and thus exposed to the atmosphere. As a result, when the inflation of the airbag 10 is started in the state where the object C such as the occupant is present over the instrument panel 1 or in the immediate vicinity thereof, gas will flow out of the vent holes 14 immediately after the start of the inflation, thus reducing a force applied to the object C from the airbag 10.

In this embodiment, when the airbag 10 is initially formed into the spread body illustrated in FIG. 5A to FIG. 6 in folding the airbag 10, each vent hole 14 is at least partially located at a position that is closer to the lower end of the flap 11b or 12b relative to the front edge 7f of the bag attachment ring 7 and closer to the upper end of the flap 11b or 12b relative to the rear edge 7r of the bag attachment ring 7. Accordingly, in the airbag folded body 10B formed by performing the primary folding and secondary folding on the spread body as described above, each vent hole 14 is at least partially located right above the bag attachment ring 7. Therefore, a distance between the inflator opening 13a and each vent hole 14 is short, and gas ejected from the inflator 3 reaches each vent hole 14 after a lapse of a short time from the start of inflation of the airbag 10, so that the gas will quickly flow out of the airbag 10 through each vent hole 14.

In this embodiment, as illustrated in FIG. 3, the hollow region 15, vertically passing through a gap between the right half airbag 11 and the left half airbag 12, exists between the seams 41 and 42 and the base end chamber 13. The hollow region 15 is formed so that a lower end thereof is at least partially located closer to the rear of the vehicle relative to the rearmost end 1a of the instrument panel 1 in the state where the inflation of the airbag 10 is completed. In other words, in the state where the inflation of the airbag 10 is completed, the lower end opening of the hollow region 15 is at least partially exposed at the lower surface of the airbag 10 at a position located closer to the rear of the vehicle relative to the rearmost end 1a of the instrument panel 1.

Accordingly, for example, as illustrated in FIG. 23A, when the inflation of the airbag 10 is started in the state where the object C such as the occupant is present at a position that is located over the instrument panel 1 or in the immediate vicinity thereof but is not opposed to the door portion or lid of the instrument panel 1, the object C will be swallowed up by the hollow region 15 as illustrated in FIG. 23B.

Furthermore, as illustrated in FIG. 24A, even when the object C whose size is similar to that of a child dummy is present between the instrument panel 1 and the passenger seat so as to be in close proximity to the instrument panel or in contact therewith at the time of inflation of the airbag 10, the object C will be swallowed up by the hollow region 15.

In this embodiment, as mentioned above, the bellows folded body J formed by folding the upper end portion of the primary folded body 10A is located above the roll folded body R formed by folding the lower end portion of the primary folded body 10A. Hence, at the time of inflation of the airbag 10, the bellows folded body J located at an upper end part of the airbag 10 is pushed out from the retainer 2 into the cabin ahead of the roll folded body R located at a lower end part of the airbag 10, and thus the upper end part of the airbag 10 is inflated and expanded before the lower end part thereof is inflated and expanded. As a result, as illustrated in FIG. 24A, the airbag 10 is inflated and expanded toward the rear of the vehicle in such a manner that the airbag 10 jumps over the object C in the vicinity of the instrument panel 1, thus preventing the airbag 10, which is being inflated, from pressing the object C excessively rearward. Then, as illustrated in FIGS. 23B and 24B, the lower end part of the airbag 10 is inflated to allow the object C to be swallowed up by the hollow region 15, thereby restraining the object C by the airbag 10. In this case, the airbag 10 is inflated downward so as to cover the object C from above, and therefore, the object C will be smoothly swallowed up by the hollow region 15.

The foregoing embodiment is provided by way of example only, and the present invention may take forms other than those illustrated.

For example, in the foregoing embodiment, the upper end portion of the primary folded body 10A of the airbag 10 is formed into a bellows folded body and the lower end portion of the primary folded body 10A is formed into a roll folded body; however, both of the upper and lower end portions of the primary folded body 10A may be formed into bellows folded bodies or may be formed into roll folded bodies. Alternatively, the upper end portion of the primary folded body 10A may be formed into a roll folded body, and the lower end portion of the primary folded body 10A may be formed into a bellows folded body.

The airbag illustrated in the foregoing embodiment is a so-called "twin bag type" airbag having: the right half airbag 11 to be inflated toward the right front of the occupant on the passenger seat; the left half airbag 12 to be inflated toward the left front of the occupant on the passenger seat; and the base end chamber 13 communicated with the front ends of the right half airbag 11 and the left half airbag 12 (i.e., the base ends thereof with respect to the inflation direction), but the present invention is also applicable to passenger-side airbags other than the foregoing airbag. For example, the present invention is also applicable to a passenger-side airbag, the inside of which consists of a single chamber as described in Japanese Unexamined Patent Application Publication No. 6-227353.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A passenger-side airbag comprising:
   a folded body of an airbag in which an inflator opening is provided at a base end of the airbag and a vent hole is provided at each of right and left side surfaces of the airbag,
   wherein right and left end parts of the airbag are folded along vertical fold lines, thereby providing a vertically long primary folded body,
   wherein the primary folded body is folded along lateral fold lines, thereby providing the passenger-side airbag folded body serving as a final folded body,
   wherein the vent holes are exposed at right and left end faces of the final folded body, and
   wherein a bag attachment ring in the airbag base end surrounds the inflator opening, and opposite right and left portions of the airbag primary folded body extending between and to the bag attachment ring and the vent holes are each folded toward the inside of the airbag about only a single one of the vertical fold lines so that upon airbag inflation, the right and left opposite airbag portions quickly unfold to rapidly shift the vent holes to positions outside a retainer containing the airbag final folded body and above a passenger-side instrument panel to which the retainer is mounted.

2. The passenger-side airbag according to claim 1,
   wherein a plurality of small holes are provided in the base end around the inflator opening, and
   wherein the bag attachment ring comprises a frame body surrounding the inflator opening and a plurality of bolts provided vertically with respect to the frame body, is attached so as to surround the inflator opening, each bolt is inserted through the associated small hole.

3. The passenger-side airbag according to claim 2,
   wherein a portion of the primary folded body, located below the bag attachment ring, is subjected to roll folding, and a portion of the primary folded body, located above the bag attachment ring, is subjected to bellows folding.

4. The passenger-side airbag according to claim 2,
   wherein the airbag is formed into a spread body flatly spread out so that its longitudinal thickness is reduced, and then right and left end portions of the spread body are folded along the vertical fold lines, thereby providing the primary folded body, and
   wherein in the spread body, the inflator opening is exposed at a surface of the spread body, located opposite to an occupant, and each vent hole is at least partially located at a position that is below an upper end of an outer peripheral edge of the bag attachment ring surrounding the inflator opening, and that is above a lower end of the outer peripheral edge of the bag attachment ring.

5. A passenger-side airbag apparatus comprising:
   the passenger-side airbag of claim 1; and
   an inflator configured to inflate the airbag.

6. An airbag apparatus for a passenger seat that is folded up in a normal state and received in a retainer and is inflated and deployed in an emergency state by deployment gas supplied from an inflator, the airbag comprising:
   a base fabric constituting an outer shell of the airbag, the base fabric comprising:
      a base end surface having an inflator opening through which the inflator is to be inserted;
      a right side surface having a right vent hole; and
      a left side surface having a left vent hole, wherein the base fabric is folded about fold lines in the normal state such that the right and left vent holes are exposed to the outside of the folded up airbag, and opposite right and left portions of the airbag extending between and to the base end surface and the respective right and left vent holes are each folded inwardly about only a single one of a plurality of vertical fold lines used for forming the folded up airbag so that upon airbag inflation, the right and left opposite airbag portions quickly unfold to rapidly shift the vent holes to positions outside the retainer.

7. The airbag apparatus of claim 6 wherein the retainer has sides that lack side apertures therein for corresponding to the vent holes of the airbag.

8. An airbag apparatus comprising:
   an airbag for being deployed generally rearwardly in a vehicle in an emergency condition;
   right and left side surfaces of the airbag each having a vent hole therein;
   a retainer for being mounted in the vehicle;
   a folded body of the airbag for being received in the retainer, the airbag folded body comprising an intermediate, vertically long folded body formed by folding right and left end portions of the airbag along vertical fold lines with the intermediate folded body then folded along lateral fold lines to form the airbag folded body to be received in the retainer; and
   right and left end faces of the airbag folded body in which the corresponding right and left vent holes are disposed with upper and lower portions of the vent holes folded inwardly beyond the end faces for providing a compact size for the airbag folded body and the retainer in which the airbag folded body is received.

9. The passenger-side airbag apparatus of claim 8 wherein the retainer has sides that lack side apertures therein for corresponding to the vent holes of the airbag.

10. The passenger-side airbag apparatus of claim 8 wherein the airbag has a base end including an inflator opening therein and a bag attachment ring extending about the inflator opening with the vent holes and the bag attachment ring arranged so that at least portions of the vent holes vertically overlap the bag attachment ring in the airbag folded body.

* * * * *